United States Patent
Hassibi et al.

(10) Patent No.: US 11,592,521 B1
(45) Date of Patent: *Feb. 28, 2023

(54) SIGNAL DETECTION AND DENOISING SYSTEMS

(71) Applicant: Neural Propulsion Systems, Inc., Pleasanton, CA (US)

(72) Inventors: Babak Hassibi, San Marino, CA (US); Behrooz Rezvani, San Ramon, CA (US)

(73) Assignee: Neural Propulsion Systems, Inc., Pleasanton, CA (US)

( * ) Notice: Subject to any disclaimer, the term of this patent is extended or adjusted under 35 U.S.C. 154(b) by 58 days.

This patent is subject to a terminal disclaimer.

(21) Appl. No.: 17/120,127

(22) Filed: Dec. 12, 2020

Related U.S. Application Data

(63) Continuation of application No. 16/569,011, filed on Sep. 12, 2019, now Pat. No. 10,866,304.

(60) Provisional application No. 62/730,405, filed on Sep. 12, 2018.

(51) Int. Cl.
*G01S 7/292* (2006.01)
*G01S 7/295* (2006.01)
*G01S 7/35* (2006.01)

(52) U.S. Cl.
CPC ............ *G01S 7/2921* (2013.01); *G01S 7/295* (2013.01); *G01S 7/354* (2013.01)

(58) Field of Classification Search
None
See application file for complete search history.

(56) References Cited

U.S. PATENT DOCUMENTS

| | | |
|---|---|---|
| 4,884,229 A | 11/1989 | Dekker |
| 6,882,311 B2 | 4/2005 | Walker et al. |
| 7,079,071 B2 | 7/2006 | Ikeda |
| 7,911,373 B2 | 3/2011 | Weinstein et al. |
| 9,058,303 B2 | 6/2015 | Bouchard et al. |
| 9,229,100 B2 | 1/2016 | Lee et al. |
| 9,632,178 B2 | 4/2017 | Kim et al. |

(Continued)

OTHER PUBLICATIONS

Reinhard Heckel, "Super-resolution MIMO radar," 2016 IEEE International Symposium on Information Theory, pp. 1416-1420, Jul. 2016.

(Continued)

*Primary Examiner* — Whitney Moore
(74) *Attorney, Agent, or Firm* — Jacobsen IP Law; Krista S. Jacobsen

(57) ABSTRACT

Disclosed herein are systems and methods for estimating target ranges, angles of arrival, and speed using optimization procedures. Target ranges are estimated by performing an optimization procedure to obtain a denoised signal, performing a correlation of a transmitted waveform and the denoised signal, and using a result of the correlation to determine an estimate of a distance between the sensor and at least one target. Target angles of arrival are estimated by determining ranges at which targets are located, and, for each range, constructing an array signal from samples of received echo signals, and using the array signal, performing another optimization procedure to estimate a respective angle of arrival for each target of the at least one target. Doppler shifts may also be estimated using another optimization procedure. Certain of the optimization procedures use atomic norm techniques.

17 Claims, 22 Drawing Sheets

(56) References Cited

U.S. PATENT DOCUMENTS 9,791,561 B2    10/2017    Rhee et al.
2018/0356506 A1    12/2018    Bilik et al.

OTHER PUBLICATIONS

Zhihui Zhu et al., "Super-Resolution in SAR Imaging: Analysis With the Atomic Norm," 2016 IEEE Sensor Array and Multichannel Signal Processing Workshop (SAM), Jul. 2016.

Badri Narayan Bhaskar, Gongguo Tang, and Benjamin Recht, "Atomic norm denoising with applications to line spectral estimation," Apr. 2012, Revised Feb. 2013.

Badri Narayan Bhaskary et al., "Atomic norm denoising with applications to line spectral estimation," Feb. 16, 2013.

Danial Ehyaie, "Novel Approaches to the Design of Phased Array Antennas," dissertation submitted in partial fulfillment of the requirement for the degree of Doctor of Philosophy (Electrical Engineering) in the University of Michigan, 2011.

Dijana Tralic, Sonja Grgic, "Signal Reconstruction via Compressive Sensing," Proceedings ELMAR-2011, Sep. 14-16, 2011.

Emmanuel Candes and Benjamin Recht, "Simple Bounds for Recovering Low-complexity Models," Jun. 2011; revised Feb. 2012.

Emmanuel Candes and Terence Tao, "Decoding by Linear Programming," Dec. 2004.

Emmanuel J. Candès and Michael B. Wakin, "An Introduction to Compressive Sampling," IEEE Signal Processing Magazine, Mar. 2008.

Gianluigi Pillonetto et al., "Regularized linear system identification using atomic, nuclear and kernel-based norms: the role of the stability constraint," Jul. 2, 2015.

Guoshen Yu et al., "Audio Denoising by Time-Frequency Block Thresholding," IEEE Transactions on Signal Processing, vol. 56, No. 5, May 2008.

Laurent Condat, "Atomic Norm Minimization for Decomposition into Complex Exponentials," First version: Jan. 2016, enclosed version: Sep. 25, 2018.

Louis L. Scharf et al., "Sensitivity Considerations in Compressed Sensing," 2011 Asilomar Conference on Signals, Systems, and Computers, Pacific Grove, CA, Nov. 6-9, 2011.

M. Fazel et al., "Hankel Matrix Rank Minimization With Applications to System Identification and Realization," Siam J. Matrix Anal. Appl., 34(3), 946-977 (2013).

Mark Weber, John Cho, James Flavin, Jeffrey Herd, and Michael Vai, "Multi-Function Phased Array Radar for U.S. Civil-Sector Surveillance Needs," 2005.

Matthew A. Herman and Thomas Strohmer, "High-Resolution Radar via Compressed Sensing," IEEE Transactions on Signal Processing, vol. 57, Issue: 6 , Jun. 2009, pp. 2275-2284.

Matthew Herman and Thomas Strohmer, "Compressed sensing radar," 2008 IEEE Radar Conference, May 26-30, 2008.

Mohammad Toghi et al., "Projection Onto Convex Sets (POCS) Based Signal Reconstruction Framework with an associated cost function," Feb. 11, 2014.

N. P. Waweru et al., "Performance Analysis of MUSIC, Root-MUSIC and ESPRIT DOA Estimation Algorithm," World Academy of Science, Engineering and Technology International Journal of Electronics and Communication Engineering vol. 8, No. 1, 2014.

Ousmane Abdoulaye Oumar et al., "Comparison between MUSIC and ESPRIT Direction of Arrival Estimation Algorithms for Wireless Communication Systems," The First International Conference on Future Generation Communication Technologies, London, UK, Dec. 12-14, 2012.

Parikshit Shah et al., "Linear System Identification via Atomic Norm Regularization," Apr. 3, 2012.

Parikshit Shah, "Atomic Norm Regularization for Signal and System Identification," 2012.

Sean Victor Hum, "Radar Systems," Aug. 2018.

Shuang Li et al., "Atomic Norm Minimization for Modal Analysis from Random and Compressed Samples," Dec. 21, 2017.

Thomas Strohmer and Benjamin Friedlander, "Analysis of Sparse MIMO Radar," Applied and Computational Harmonic Analysis, vol. 37, Issue 3, Nov. 2014, pp. 361-388.

Thu L. N. Nguyen and Yoan Shin, "Detection and Estimation via Compressive Sensing," Dec. 2014.

Venkat Chandrasekaran et al., "The Convex Geometry of Linear Inverse Problems," Dec. 3, 2010; revised Feb. 24, 2012.

W. Xu, C. Gu, C. Li and M. Sarrafzadeh, "Robust Doppler radar demodulation via compressed sensing," Electronics Letters Oct. 25, 2012 vol. 48 No. 22.

Weiyu Xu et al., "Precise Semidefinite Programming Formulation of Atomic Norm Minimization for Recovering D-Dimensional (D>=2) Off-The-Grid Frequencies," Dec. 2, 2013.

Y. Chi et al., "Harnessing Sparsity over the Continuum: Atomic Norm Minimization for Super Resolution," Aug. 26, 2019.

Yuejie Chi et al., "Compressive Two-Dimensional Harmonic Retrieval via Atomic Norm Minimization," IEEE Transactions on Signal Processing, vol. 63, No. 4, Feb. 15, 2015.

Yuejie Chi et al., "The Sensitivity to Basis Mismatch of Compressed Sensing for Spectrum Analysis and Beamforming," 2009.

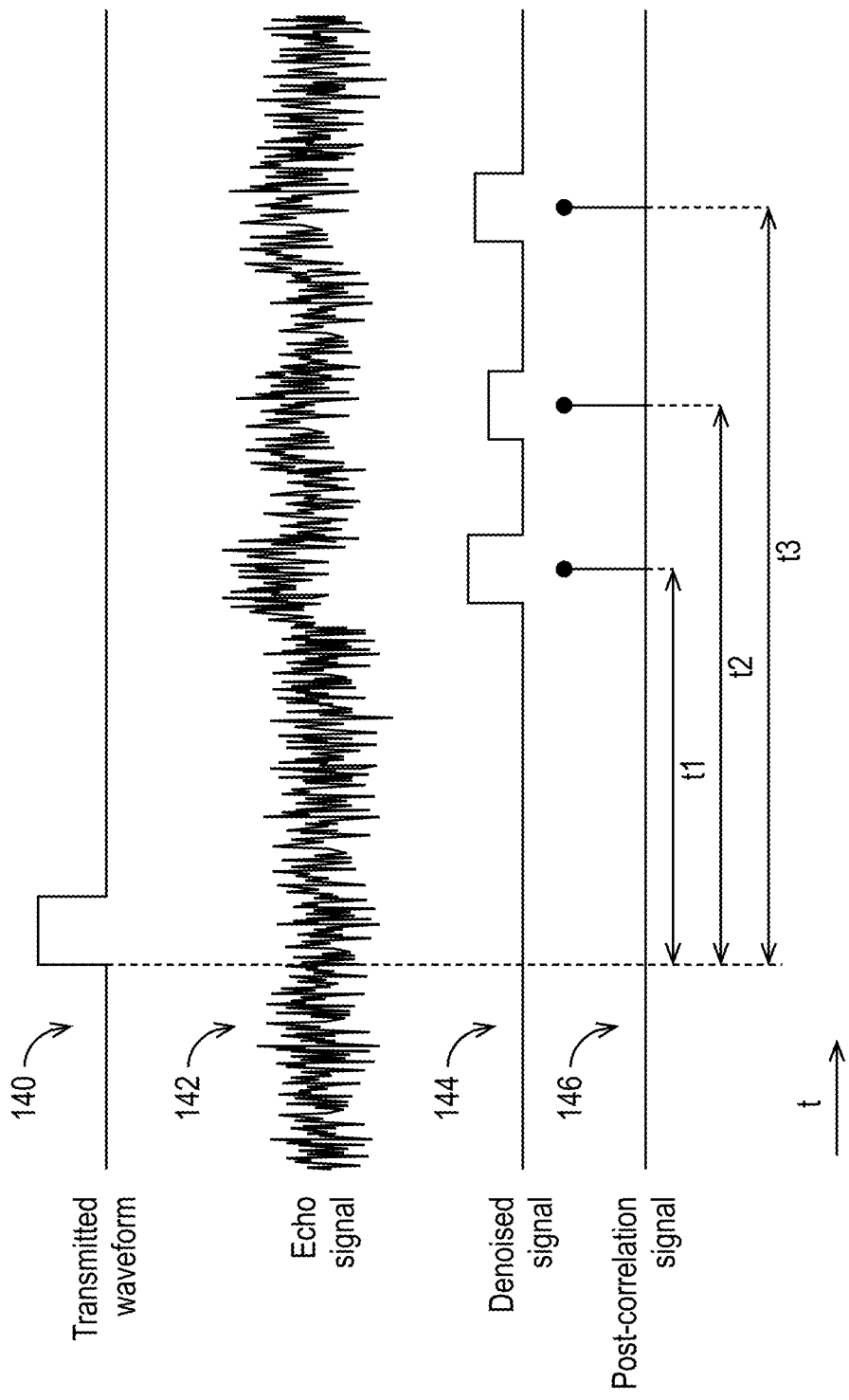

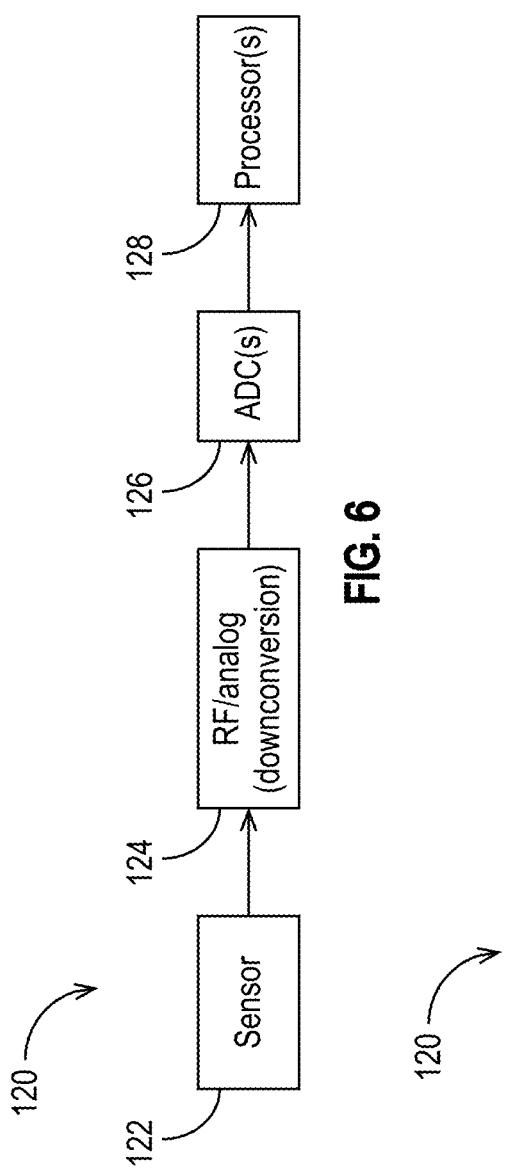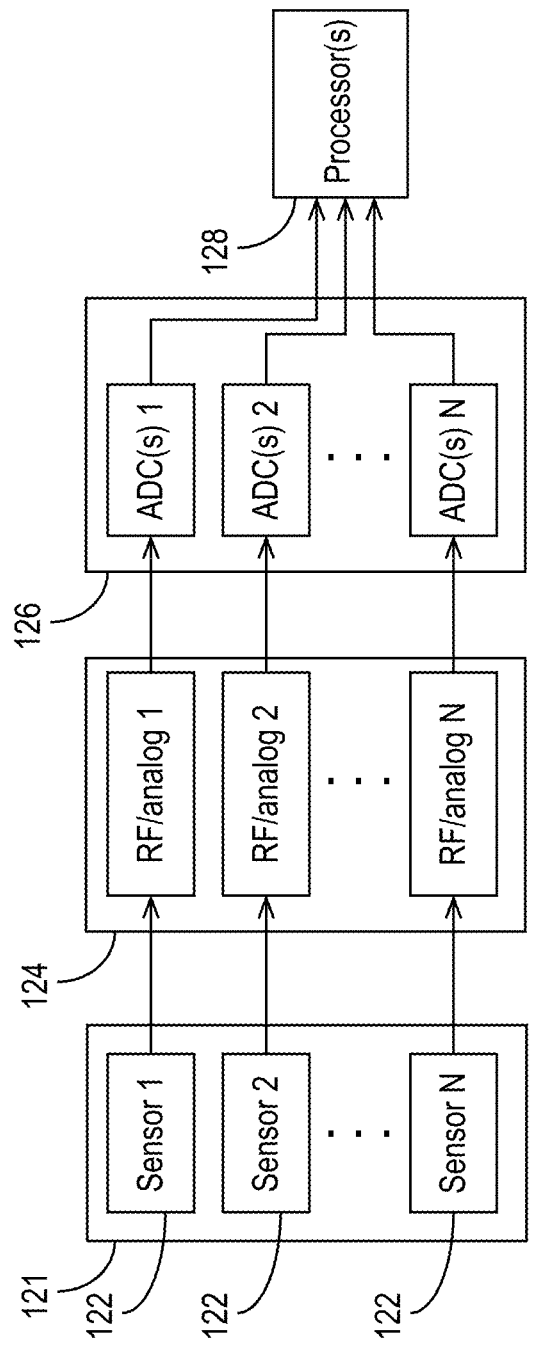

SIGNAL DETECTION AND DENOISING SYSTEMS

CROSS-REFERENCE TO RELATED APPLICATIONS

This application is a continuation of U.S. application Ser. No. 16/569,011, filed Sep. 12, 2019 and entitled "SIGNAL DETECTION AND DENOISING SYSTEMS," which claims the benefit of U.S. Provisional Application No. 62/730,405, filed Sep. 12, 2018 and entitled "Low Power Radar." Both of the above-referenced applications are hereby incorporated by reference in their entireties for all purposes.

BACKGROUND

Radio detection and ranging ("radar") systems use radio signals to determine, among other things, the position and/or speed of an object, which may be referred to as a target. The radar system transmits a radio signal, the target reflects the transmitted signal, and the radar system receives the reflected signal and uses it to determine the speed, location, or velocity (speed and direction) of the target. Radar is used in many applications, such as weather monitoring, air traffic control, speed enforcement, autonomous driving, medical imaging, and military applications.

Continuous-wave (CW) radar systems transmit radio signals on a continuous basis. Pulsed radar transmitters are switched on and off (pulsed) to provide range timing information with each pulse. The maximum target detection range of either type of radar system is proportional to the transmitter output power. Other systems, such as, for example, such as light detection and ranging (LIDAR) and sonar systems, have similar limitations. It would be desirable to increase the range and angular resolution of these systems. And it would also desirable to reduce the output power of these systems' transmitters without a commensurate degradation to the range or accuracy of the target detection ability. Conventional systems also tend to be expensive, and it would be desirable to reduce their cost.

There is, therefore, an ongoing need for improvements in target detection systems.

SUMMARY

This summary represents non-limiting embodiments of the disclosure.

Disclosed herein are systems and methods for detecting targets and estimating their positions/distances, angles of arrival, and/or movement (e.g., velocity or speed), and/or identifying characteristics of such targets (e.g., radar cross section, or composition material, etc.).

In some embodiments, a system comprises a sensor (e.g., an antenna) for receiving an echo signal off of at least one target, at least one analog-to-digital converter (ADC) coupled to the sensor and configured to generate samples of the echo signal, and at least one processor. The at least one processor is configured to execute at least one machine-executable instruction that, when executed, causes the at least one processor to (a) perform an optimization procedure using at least a portion of the samples of the echo signal to obtain a denoised signal, (b) perform a correlation of a transmitted waveform and the denoised signal, and (c) using a result of the correlation of the transmitted waveform and the denoised signal, determine at least one range value, the at least one range value being an estimate of a distance between the sensor and the at least one target.

In some such embodiments, the at least one range value comprises a first range value representing an estimate of a distance between the sensor and a first target, and a second range value representing an estimate of a distance between the sensor and a second target.

In some embodiments, the optimization procedure comprises a projected gradient descent procedure.

In some embodiments, when executed by the at least one processor, the at least one machine-executable instruction further causes the at least one processor to modify an aspect of the optimization procedure in response to additional information other than the samples of the echo signal.

In some embodiments, performing the optimization procedure to obtain the denoised signal comprises minimizing an atomic norm of the denoised signal subject to a constraint on a metric characterizing a closeness of the denoised signal to the samples of the echo signal. In some such embodiments, the atomic norm corresponds to a collection of atoms, wherein each atom is a time-shifted version of the transmitted waveform. In some embodiments, minimizing the atomic norm comprises performing a frequency-domain atomic norm optimization procedure, or performing a projected gradient descent.

In some embodiments, the metric characterizing the closeness of the denoised signal to the samples of the echo signal is a squared Euclidean distance. In some embodiments, the metric characterizing the closeness of the denoised signal to the samples of the echo signal is an information-theoretic metric. In some embodiments, the metric characterizing the closeness of the denoised signal to the samples of the echo signal is an $L^1$ norm, an $L^2$ norm, or an $L^\infty$ norm.

In some embodiments, performing the optimization procedure to obtain the denoised signal comprises minimizing a metric characterizing a closeness of the denoised signal to the samples of the echo signal subject to a constraint on an atomic norm of the denoised signal. In some such embodiments, the atomic norm corresponds to a collection of atoms, wherein each atom is a time-shifted version of the transmitted waveform. In some embodiments, the atomic norm is obtained from a frequency-domain atomic norm optimization procedure. In some embodiments, the atomic norm is obtained from a projected gradient descent procedure.

In some embodiments, the metric characterizing the closeness of the denoised signal to the samples of the echo signal is a squared Euclidean distance. In some embodiments, the metric characterizing the closeness of the denoised signal to the samples of the echo signal is an information-theoretic metric. In some embodiments, the metric characterizing the closeness of the denoised signal to the samples of the echo signal is an $L^1$ norm, an $L^2$ norm, or an $L^\infty$ norm.

In some embodiments, performing the optimization procedure to obtain the denoised signal comprises minimizing a weighted sum of (a) a metric characterizing a closeness of the denoised signal to the samples of the echo signal and (b) an atomic norm of the denoised signal. In some such embodiments, the atomic norm corresponds to a collection of atoms, wherein each atom is a time-shifted version of the transmitted waveform. In some embodiments, the atomic norm is obtained from a frequency-domain atomic norm optimization procedure. In some embodiments, the atomic norm is obtained from a projected gradient descent procedure.

In some embodiments, the metric characterizing the closeness of the denoised signal to the samples of the echo signal is a squared Euclidean distance. In some embodiments, the metric characterizing the closeness of the denoised signal to the samples of the echo signal is an information-theoretic metric. In some embodiments, the metric characterizing the closeness of the denoised signal to the samples of the echo signal is an $L^1$ norm, an $L^2$ norm, or an $L^\infty$ norm.

In some embodiments, performing the correlation of the transmitted waveform and the denoised signal comprises directly performing the correlation in the time domain, or performing an equivalent operation in the frequency domain.

In some embodiments, determining at least one range value comprises identifying at least one peak in the result of the correlation of the transmitted waveform and the denoised signal, and computing the estimate of the distance between the sensor and the at least one target based at least in part on a position of the at least one peak within the result of the correlation of the transmitted waveform and the denoised signal.

In some embodiments, determining the at least one range value comprises performing a Fourier transform.

In some embodiments, the system further comprises memory coupled to the at least one processor.

In some embodiments, the system further comprises a plurality of additional sensors for receiving respective echo signals off of the at least one target, and the at least one ADC is coupled to each of the plurality of additional sensors and configured to generate respective samples of the respective echo signal. In some such embodiments when executed by the at least one processor, the at least one machine-executable instruction further causes the at least one processor to, for each of the plurality of additional sensors, (a) perform the optimization procedure, using at least a portion of the samples of the respective echo signal, to obtain a respective denoised signal, (b) perform a correlation of the transmitted waveform and the respective denoised signal, and (c) using a result of the correlation of the transmitted waveform and the respective denoised signal, determine a respective at least one range value, the respective at least one range value being an estimate of a distance between the respective sensor and the at least one target.

In some embodiments having more than two sensors, the sensor is a first sensor, and the plurality of additional sensors comprises second and third sensors, the first, second, and third sensors being non-collinear. In some such embodiments, the second sensor is disposed between the first and third sensors, and a distance between the first and second sensors differs from a distance between the second and third sensors.

In some embodiments having more than two sensors, the sensor is a first sensor, and the plurality of additional sensors comprises second and third sensors, the first, second, and third sensors being collinear. In some such embodiments, the second sensor is disposed between the first and third sensors, and a distance between the first and second sensors differs from a distance between the second and third sensors.

In some embodiments, in addition to being configured to receive a first echo signal in a first frequency band, the sensor is configured to receive a second echo signal in at least a second frequency band. In some such embodiments, the at least one ADC is configured to generate samples of the first and second echo signals, and, when executed by the at least one processor, at least one machine-executable instruction causes the at least one processor to (a) perform an optimization procedure, using at least a portion of the samples of the first echo signal, to obtain a first denoised signal, (b) perform the optimization procedure, using at least a portion of the samples of the second echo signal, to obtain a second denoised signal, (c) perform a correlation of a first transmitted waveform (transmitted in the first frequency band) and the first denoised signal, (d) perform a correlation of a second transmitted waveform (transmitted in the second frequency band) and the second denoised signal, (e) using a result of the correlation of the first transmitted waveform and the first denoised signal, determine a first at least one range value, the first at least one range value being a first estimate of a distance between the sensor and the at least one target, and (f) using a result of the correlation of the second transmitted waveform and the second denoised signal, determine a second at least one range value, the second at least one range value being a second estimate of the distance between the sensor and the at least one target. In some such embodiments, steps (a) and (b) occur substantially simultaneously. In some embodiments, steps (c) and (d) occur substantially simultaneously. In some embodiments, steps (e) and (f) occur substantially simultaneously.

In some embodiments, the system comprises more than one sensor and is configured to estimate target angles of arrival. In some such embodiments, the sensor is a first sensor, the echo signal is a first echo signal, the samples of the echo signal are first samples of the first echo signal, the denoised signal is a first denoised signal, the at least one range value is a first at least one range value, and the optimization procedure is a first optimization procedure, and the system further comprises a second sensor for receiving a second echo signal off of the at least one target. In some such embodiments, the at least one ADC is coupled to the second sensor and configured to generate second samples of the second echo signal, and, when executed by the at least one processor, the at least one machine-executable instruction further causes the at least one processor to: (a) perform the first optimization procedure, using at least a portion of the second samples of the second echo signal, to obtain a second denoised signal, (b) perform a correlation of the transmitted waveform and the second denoised signal, (c) using a result of the correlation of the transmitted waveform and the second denoised signal, determine a second at least one range value, the second at least one range value being an estimate of a distance between the second sensor and the at least one target, (d) using the first denoised signal, the second denoised signal, and the first at least one range value, construct a first array signal, (e) using the first array signal, perform a second optimization procedure to estimate a first respective angle of arrival for each target of the at least one target, (f) using the first denoised signal, the second denoised signal, and the second at least one range value, construct a second array signal, and (g) using the second array signal, perform the second optimization procedure to estimate a second respective angle of arrival for each target of the at least one target.

In some such embodiments, performing the second optimization procedure comprises obtaining a denoised array signal from an array signal, and applying an angle-of-arrival estimation algorithm to the denoised array signal. In some embodiments, the second optimization procedure comprises a projected gradient descent.

In some embodiments, when executed by the at least one processor, the at least one machine-executable instruction further causes the at least one processor to modify an aspect of the second optimization procedure in response to additional information other than the samples of the echo signal.

In some embodiments, obtaining the denoised array signal from the array signal comprises minimizing an atomic norm of the denoised array signal subject to a constraint on a metric characterizing a closeness of the denoised array signal to the array signal. In some embodiments, the atomic norm corresponds to a collection of atoms, wherein each atom is a planar wave with a respective arrival angle that differs from the respective arrival angle of every other atom. In some embodiments, the metric characterizing the closeness of the denoised array signal to the array signal is a squared Euclidean distance. In some embodiments, the metric characterizing the closeness of the denoised array signal to the array signal is an information-theoretic metric. In some embodiments, the metric characterizing the closeness of the denoised array signal to the samples of the array signal is an $L^1$ norm, an $L^2$ norm, or an $L^\infty$ norm.

In some embodiments, obtaining the denoised array signal from the array signal comprises minimizing a metric characterizing a closeness of the denoised array signal to the array signal subject to a constraint on an atomic norm of the denoised array signal. In some embodiments, the atomic norm corresponds to a collection of atoms, wherein each atom is a planar wave with a respective arrival angle that differs from the respective arrival angle of every other atom. In some embodiments, the metric characterizing the closeness of the denoised array signal to the array signal is a squared Euclidean distance. In some embodiments, the metric characterizing the closeness of the denoised array signal to the array signal is an information-theoretic metric. In some embodiments, the metric characterizing the closeness of the denoised array signal to the samples of the array signal is an $L^1$ norm, an $L^2$ norm, or an $L^\infty$ norm.

In some embodiments, obtaining the denoised array signal from the array signal comprises minimizing a weighted sum of (a) a metric characterizing a closeness of the denoised array signal to the array signal and (b) an atomic norm of the denoised array signal. In some such embodiments, the atomic norm corresponds to a collection of atoms, wherein each atom is a planar wave with a respective arrival angle that differs from the respective arrival angle of every other atom. In some embodiments, the metric characterizing the closeness of the denoised array signal to the array signal is a squared Euclidean distance. In some embodiments, the metric characterizing the closeness of the denoised array signal to the array signal is an information-theoretic metric. In some embodiments, the metric characterizing the closeness of the denoised array signal to the samples of the array signal is an $L^1$ norm, an $L^2$ norm, or an $L^\infty$ norm.

In some embodiments in which the target angles of arrival are estimated, the angle-of-arrival estimation algorithm comprises a Hankel norm approximation, MUSIC, ESPRIT, or Prony's method.

In some embodiments, when executed by the at least one processor, the at least one machine-executable instruction further causes the at least one processor to perform a third optimization procedure, using the first denoised signal, the second denoised signal, the first at least one range value, and the second at least one range value, to determine a speed or velocity of the target.

In some embodiments, when executed by the at least one processor, the at least one machine-executable instruction further causes the at least one processor to modify an aspect of the third optimization procedure in response to additional information other than the samples of the echo signal.

In some embodiments, the system further comprises at least one transmitter. In some embodiments, the system includes (a) a first transmitter for transmitting, for a time period, a first instance of a waveform modulated onto a first carrier signal having a carrier frequency and a first phase, and (b) a second transmitter for transmitting, for the time period and substantially synchronously with the first transmitter, a second instance of the waveform modulated onto a second carrier signal having the carrier frequency and a second phase, the second phase being different from the first phase, the first and second instances of the waveform being substantially identical. In some such embodiments, the first and second carrier signals are the same.

In some embodiments, the first and second phases are randomly selected. In some embodiments, the first and second phases are deterministic phases. In some embodiments, when executed by the second at least one processor, the at least one machine-executable instruction further causes the second at least one processor to select the first and second phases.

In some embodiments, the system further comprises a plurality of additional transmitters, each additional transmitter for transmitting, during the time period and substantially synchronously with the first and second transmitters, a respective instance of the waveform modulated onto a respective carrier signal having the carrier frequency and a respective phase, wherein each respective phase is different from every other respective phase and different from both of the first and second phases, and wherein each of the respective instances of the waveform is substantially identical to the first and second instances of the waveform.

In some embodiments, the at least one processor is a first at least one processor, and the at least one machine-executable instruction is a first at least one machine-executable instruction, and the system further comprises a second at least one processor coupled to the first and second transmitters and configured to execute a second at least one machine-executable instruction, wherein, when executed by the second at least one processor, the second at least one machine-executable instruction causes the second at least one processor to select the first and second phases.

In some embodiments having both one or more transmitters and one or more sensors, the transmitters and sensors are collocated.

In some embodiments having at least two transmitters, the transmitted waveform is a first transmitted waveform, at least one processor is a first at least one processor, the at least one machine executable instruction is a first at least one machine-executable instruction, and the time period is a first time period, and the first and second instances of the first transmitted waveform have a first duration, and the system further comprises a second at least one processor coupled to the first and second transmitters and configured to execute a second at least one machine-executable instruction that, when executed by the second at least one processor, causes the second at least one processor to (a) cause the first transmitter to transmit, for a second time period, a first instance of a second waveform modulated onto a third carrier signal having a third carrier frequency and a third phase, and (b) cause the second transmitter to transmit, for the second time period and substantially synchronously with the first transmitter, a second instance of the second waveform modulated onto a fourth carrier signal having a fourth carrier frequency and a fourth phase, the fourth phase being different from the third phase, wherein a second duration of the first and second instances of the second waveform differs from the first duration. In some such embodiments, the second at least one processor is the first at least one processor.

In some embodiments, the first, second, third, and fourth carrier frequencies are substantially identical. In some embodiments, at least two of the first, second, third, and fourth carrier frequencies are different. In some embodiments, the third and fourth phases are randomly selected. In some embodiments, the third and fourth phases are deterministic phases. In some embodiments, the first and third phases are different and the second and fourth phases are different.

In some embodiments, when executed by the second at least one processor, the at least one machine-executable instruction further causes the second at least one processor to select the first and second phases.

In some embodiments, the system further comprises a first downconverter disposed between and coupled to the sensor and the at least one ADC. In some such embodiments, the downconverter is configured to downconvert the echo signal to baseband, and the at least one ADC is configured to generate a set of in-phase (I) samples and a set of quadrature (Q) samples for the sensor, and wherein the samples of the echo signal comprise the set of I samples and the set of Q samples (e.g., as complex-valued samples). In some embodiments, the downconverter is configured to downconvert the echo signal to an intermediate frequency, and the at least one ADC is configured to sample the echo signal while it resides at the intermediate frequency.

In some embodiments, the system is a radar system. In some embodiments, the system is a light detection and ranging (LIDAR) system. In some embodiments, the system is a sonar system.

In some embodiments, a system uses an optimization procedure to estimate angles of arrival of targets. In some such embodiments, a system comprises a first sensor for receiving a first echo signal off of at least one target, a second sensor for receiving a second echo signal off of the at least one target, at least one analog-to-digital converter (ADC) coupled to the first and second sensors and configured to generate first samples of the first echo signal and second samples of the second echo signal, and at least one processor configured to execute at least one machine-executable instruction that, when executed, causes the at least one processor to (a) using at least a portion of the first samples of the first echo signal and at least a portion of the second samples of the second echo signal, determine at least one range value, the at least one range value being an estimate of a distance between the first and second sensor and the at least one target, and (b) for each range value of the at least one range value, construct a respective array signal from the first and second samples, and using the respective array signal, perform an optimization procedure to estimate a respective angle of arrival for each target of the at least one target.

In some such embodiments, performing the optimization procedure comprises obtaining a respective denoised array signal from the respective array signal, and applying an angle-of-arrival estimation algorithm to the respective denoised array signal.

In some such embodiments, obtaining the respective denoised array signal from the respective array signal comprises minimizing an atomic norm of the respective denoised array signal subject to a constraint on a metric characterizing a closeness of the respective denoised array signal to the respective array signal. In some such embodiments, the atomic norm corresponds to a collection of atoms, wherein each atom is a planar wave with a respective arrival angle that differs from the respective arrival angle of every other atom. In some embodiments, the metric characterizing the closeness of the respective denoised array signal to the respective array signal is a squared Euclidean distance. In some embodiments, the metric characterizing the closeness of the respective denoised array signal to the respective array signal is an information-theoretic metric. In some embodiments, the metric characterizing the closeness of the respective denoised array signal to the respective array signal is an $L^1$ norm, an $L^2$ norm, or an $L^\infty$ norm.

In some embodiments, obtaining the respective denoised array signal from the respective array signal comprises minimizing a metric characterizing a closeness of the respective denoised array signal to the respective array signal subject to a constraint on an atomic norm of the respective denoised array signal. In some such embodiments, the atomic norm corresponds to a collection of atoms, wherein each atom is a planar wave with a respective arrival angle that differs from the respective arrival angle of every other atom. In some embodiments, the metric characterizing the closeness of the respective denoised array signal to the respective array signal is a squared Euclidean distance. In some embodiments, the metric characterizing the closeness of the respective denoised array signal to the respective array signal is an information-theoretic metric. In some embodiments, the metric characterizing the closeness of the respective denoised array signal to the respective array signal is an $L^1$ norm, an $L^2$ norm, or an $L^\infty$ norm.

In some embodiments, obtaining the respective denoised array signal from the respective array signal comprises minimizing a weighted sum of (a) a metric characterizing a closeness of the respective denoised array signal to the respective array signal and (b) an atomic norm of the respective denoised array signal. In some such embodiments, the atomic norm corresponds to a collection of atoms, wherein each atom is a planar wave with a respective arrival angle that differs from the respective arrival angle of every other atom. In some embodiments, the metric characterizing the closeness of the respective denoised array signal to the respective array signal is a squared Euclidean distance. In some embodiments, the metric characterizing the closeness of the respective denoised array signal to the respective array signal is an information-theoretic metric. In some embodiments, the metric characterizing the closeness of the respective denoised array signal to the respective array signal is an $L^1$ norm, an $L^2$ norm, or an $L^\infty$ norm.

In some embodiments, the angle-of-arrival estimation algorithm comprises a Hankel norm approximation, MUSIC, ESPRIT, or Prony's method.

In some embodiments, the optimization procedure comprises a projected gradient descent procedure.

In some embodiments, each of the first and second sensors comprises an antenna.

In some embodiments, the system is a radar system. In some embodiments, the system is a light detection and ranging (LIDAR) system. In some embodiments, the system is a sonar system.

In some embodiments, a system comprises at least one sensor for receiving at least one echo signal off of at least one target, the at least one echo signal being the result of a transmitted signal reflecting off of the at least one target, at least one analog-to-digital converter (ADC) coupled to the and sensor and configured to generate samples of the at least one echo signal, and at least one processor. The at least one processor is configured to execute at least one machine-executable instruction that, when executed, causes the at least one processor to perform an optimization procedure, perform an optimization procedure, using at least a portion of the samples of the at least one echo signal, to estimate at least one of a respective Doppler frequency, a respective velocity, a respective speed, or a respective direction of motion for one or more targets of the at least one target. In some such embodiments, the optimization procedure comprises optimizing an atomic norm. In some embodiments, the atomic norm corresponds to a collection of atoms, wherein each atom is a time-shifted and frequency-shifted version of the transmitted waveform.

BRIEF DESCRIPTION OF THE DRAWINGS

Objects, features, and advantages of the disclosure will be readily apparent from the following description of certain embodiments taken in conjunction with the accompanying drawings in which:

FIG. 2 provides a conceptual illustration of the relationships between various signals transmitted and received by the system in accordance with some embodiments.

FIG. 6 is a high-level block diagram of a receiver in accordance with some embodiments.

FIG. 7 illustrates an exemplary embodiment comprising multiple sensors included in a sensor array in accordance with some embodiments.

DETAILED DESCRIPTION

Figure 1:
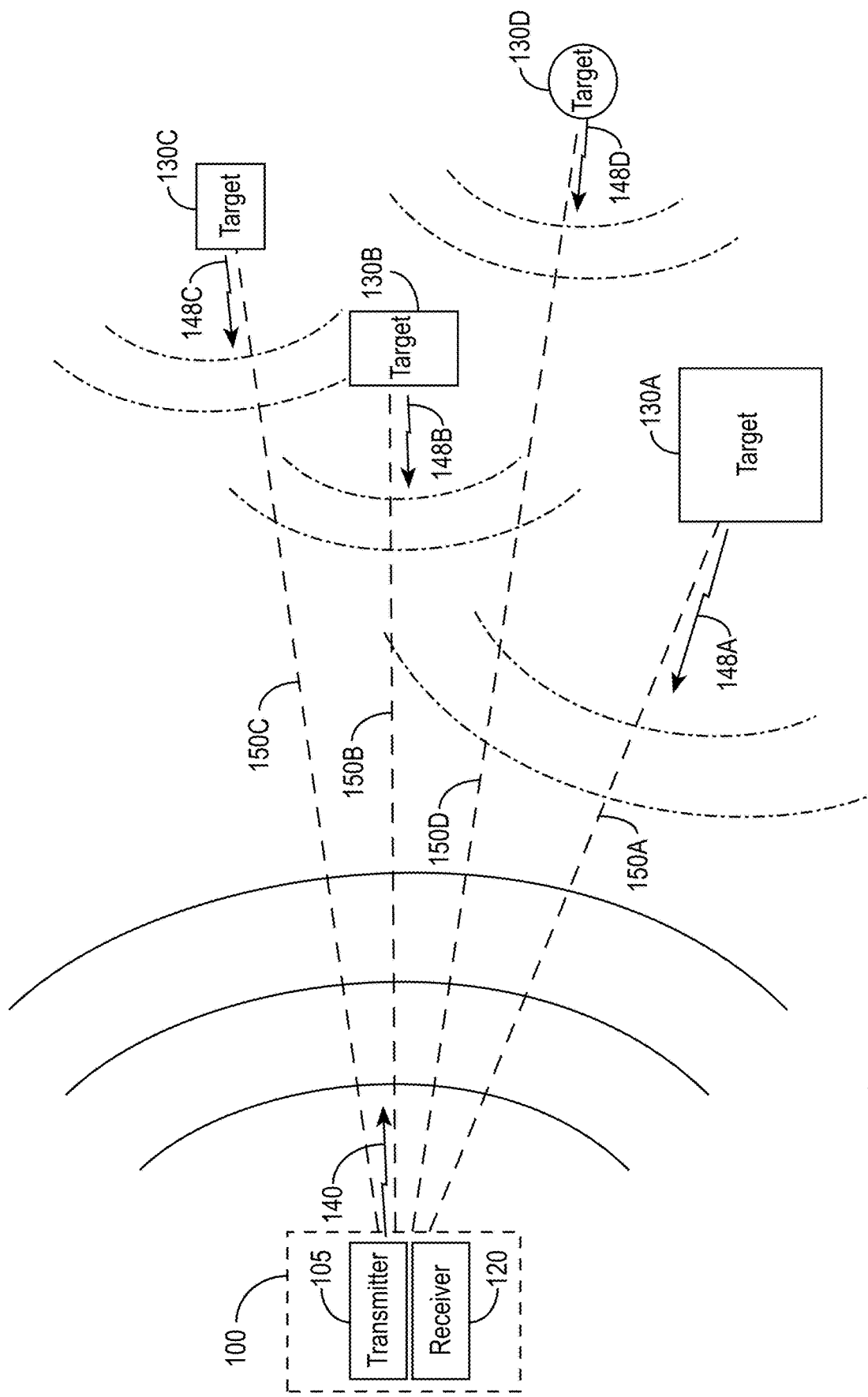
FIG. 1 illustrates a system in accordance with some embodiments.

With the advent self-driving cars and self-flying, unmanned drones, target identification technology (e.g., radar) is undergoing a renaissance. Conventional assumptions and implementations are being revisited to explore newly-discovered methods and algorithms that are possible in part because of advances in silicon technology enabling intense computation on large data sets.

Compressive sensing (CS) (also known as compressed sensing, compressive sampling, or sparse recovery) is the idea that many real-world signals can be represented by a small number of non-zero coefficients in an appropriately-selected basis. Fundamentally, CS allows an analog signal to be acquired in an already-compressed form.

CS procedures are a significant departure from traditional signal acquisition and compression methods, which sample an analog signal at or above the Nyquist rate (twice the bandwidth of the signal) and then apply a compression algorithm to reduce the amount of data that needs to be stored. For example, digital images that contain millions of individual pixels can be compressed by applying a discrete cosine transform (DCT) to the pixel values and then discarding all coefficient values smaller than a threshold value. This procedure is referred to as a "lossy" compression method because data is lost when coefficient values are discarded. For most images, however, if the threshold is selected appropriately, the reconstructed image will not appear to be degraded at all from the original because when real-world images are transformed by the DCT, most of the resulting DCT coefficients are small or negligible. Consequently, discarding the small-valued DCT coefficients does not cause a significant degradation when the image is reconstructed.

Signals that can be represented by a small number of non-zero coefficients in a selected basis are referred to as "sparse." Most real-world images are naturally sparse, which is why they can be accurately represented by far fewer than all of the DCT coefficients produced by the DCT.

The idea of CS is, essentially, to acquire only the useful information content embedded in a sparse signal and condense it into a small amount of data, all in one step. Then numerical optimization techniques can be used to "reconstruct" the original signal from the small amount of data originally acquired.

Some radar systems use sparse array processing to estimate a measured or observed signal. These systems suffer from a number of drawbacks, however, such as a need for off-grid estimation. Moreover, CS radar is known not to work well in low signal-to-noise ratio (SNR) conditions. In addition, there is a need for a large dictionary.

Disclosed herein are systems, methods, and algorithms for signal recovery using optimization procedures that take advantage of sparse array processing, and also explicitly exploit the structure of the desired signal, to "denoise" a received signal, such as by using, for example, atomic norm (AN) minimization. As used herein, the term "denoised signal" refers to a signal, which may be analog or digital, that has been subjected to an optimization procedure, the result of which is an extracted signal, which may be analog or digital, that has less noise than the original signal. As used herein, the term "optimization procedure" refers to any (possibly nonlinear) signal processing technique that explicitly exploits the structure of one or more signals being processed to select a best estimate (with regard to some criterion) from some set of (possibly uncountable) alternatives. An optimization procedure may be iterative. The systems and procedures disclosed herein can significantly improve target detection, ranging, and/or angle-of-arrival, and/or Doppler shift estimation. Among others, one benefit of the disclosed systems, methods, and algorithms is that they can significantly reduce the transmit energy (power) of systems by significantly increasing the sensitivity of an array receiver.

Although this disclosure is presented primarily in the context of a wireless array radar (sometimes referred to as phased-array radar) system, it is to be appreciated that the disclosures are applicable to other types of sensor systems, including, for example, sonar systems, light detection and ranging (LIDAR) systems, etc. In general, any system that uses reflected signals to identify a target, its distance from the sensor, its angle of arrival (abbreviated as AoA, and also referred to in the art more generally as the direction of arrival (DOA)), its velocity (direction and/or speed of movement, e.g., from Doppler shift), and/or its composition of material can benefit from the disclosures herein, as will be appreciated by those having ordinary skill in the art.

The term "antenna element" is sometimes used herein to convey that the antenna is included in an array. The terms "antenna" and "antenna element" are used largely interchangeably herein. An antenna is one example of a sensor, and some of the description below refers to antennas and antenna elements, although some of the description uses the more general term sensor. As will be appreciated by those having ordinary skill in the art, however, the word "antenna" can often be replaced by "sensor." It is to be understood that the disclosure is not limited to use with antennas, but rather is suitable for use with various sensors.

Some embodiments herein include only one receiver sensor (e.g., antenna). Other embodiments include multiple receiver sensors. Similarly, some embodiments include multiple transmitter elements. It is to be understood that in the embodiments described herein in which a transmitter has multiple transmitter elements or a receiver has multiple receiver sensors, and in contrast to conventional antenna arrays, the spacing between adjacent elements or sensors (e.g., antenna elements) in an array (whether for transmitting or receiving) need not be the same, although it can be. In conventional systems, even a slight variation in the distances between antenna elements results in undesirable sidelobes, which can cause many potential issues, such as false detection and vulnerability to the presence of strong interfering signals (e.g., jammer signals). In contrast to conventional antenna arrays, in which the antenna elements are spaced half a wavelength from each other to minimize sidelobes (where the wavelength is that of the transmitted/received signal used to detect targets), in the embodiments disclosed herein, there is no requirement that the elements (transmitter elements or receive sensors (e.g., antennas)) be any particular distance from each other. Thus, although the spacing may be regular (e.g., half of a wavelength as in conventional systems), the sensors may alternatively be placed at whatever spacing is convenient. When the transmitter elements (e.g., antennas) are not spaced at half-wavelength distances from one another, the systems and methods disclosed herein are able to take advantage of sidelobe energy as part of a broader transmit pulse in a wide spatial sense, as opposed to a narrow beam from the transmit beamformer of a conventional radar system.

Similarly, in embodiments including more than one transmitter element or more than one receiver sensor, neither the transmitter elements nor the receiver sensors in the systems disclosed herein need be collocated, although they can be. For example, some transmitter elements may be disposed in a first location, and other transmitter elements may be disposed in a second location. As another example, some receiver sensors may be disposed in a first location, and other receiver sensors may be disposed in a second location. Taking, for example, an embodiment in which a receiver sensor array is mounted on a car, some of the elements or sensors of the array may be mounted on, for example, the car's front bumper, others may be mounted on, for example, the car's roof, and still others may be mounted on, for example, the car's rear bumper. The receiver sensors may be positioned wherever it is convenient. Likewise, the transmitter elements may be positioned wherever it is convenient.

In some embodiments, at least some transmitter elements are collocated with at least some of the receiver sensors. In other embodiments, the transmitter element(s) and receiver sensor(s) are not collocated.

FIG. 1 illustrates a system 100 in accordance with some embodiments. The system 100 comprises at least one transmitter 105 (or transmitter array 111) and at least one receiver 120 (or receiver array 121). For simplicity, the explanation of FIG. 1 refers to a single transmitter 105 and a single receiver 120, but it is to be understood that, as discussed in more detail below, a system 100 can include a transmitter array 111 and multiple receivers 120. Likewise, FIG. 1 illustrates the transmitter 105 and receiver 120 being collocated. As explained above, the transmitter(s) 105 and receiver(s) 120 are not required to be collocated.

FIG. 1 illustrates four targets, 130A, 130B, 130C, and 13D, in the vicinity of the system 100. The target 130A is a distance 150A from the system 100, the target 130B is a distance 150B from the system 100, the target 150C is a distance 150C from the system 100, and the target 130D is a distance 150D from the system 100. In accordance with some embodiments, one objective of the system 100 is to estimate the distances 150A, 150B, 150C, and 150D. Another objective of the system 100 in some embodiments is to estimate the positions of the targets 130 (e.g., where on a circle of radius 150A the target 130A is, where on a circle of radius 150B the target 130B is, etc.), which are referred to as (or can be determined from) the angles of arrival. Another objective of the system 100 in some embodiments is to estimate the speeds and/or directions in which the targets 130 are moving.

In operation, the transmitter 105 transmits a respective waveform 140. It is to be understood that the waveform 140 may be a baseband signal modulated onto a carrier signal that has a specified frequency and phase. For ease of explanation, the details of modulation onto a carrier signal in the transmitter 105 and demodulation of the passband signal, whether to baseband or to an intermediate frequency, at the receiver 120 are largely ignored herein. These techniques are conventional and are well known in the art.

The transmitted waveform 140 propagates through the medium (e.g., air, water, etc.), which causes attenuation and potentially distortion, and reflects off of targets 130. The reflected signals 148A (reflected by the target 130A), 148B (reflected by the target 130B), 148C (reflected by the target 130C), and 148D (reflected by the target 130D) propagate back to the receiver 120. The reflected signals 148A, 148B, 148C, and 148D are attenuated by the medium and arrive at the receiver 120 some time after being transmitted, where the time depends on the speed at which signals propagate through the medium. The medium may be, for example, air (when the system 100 is a radar or LIDAR system) or water (when the system 100 is a sonar system). The medium and/or receiver 120 may add noise to the reflected signals 148A, 148B, 148C, and 148D.

FIG. 2 provides a conceptual illustration of the relationships between various signals transmitted and received by the system 100 in accordance with some embodiments. In the conceptual illustration of FIG. 2, the transmitted waveform 140 is illustrated as a simple pulse. As shown in FIG. 2, the received noisy waveform, referred to herein as the echo signal 142, is a superposition of the reflected signals (e.g., the reflected signals 148A, 148B, 148C, and 148D of FIG. 1) and includes contributions due to interference (e.g., multipath in a wireless environment), noise, and other impairments. It is to be understood that when the transmitted waveform 140 has been modulated onto a carrier signal for transmission, the received echo signal 142 has both an amplitude and a phase, and, when converted to baseband, has both in-phase (I) and quadrature (Q) components. (FIG. 2 does not illustrate the phase of the echo signal 142 or of any of the contributions of the reflected signals 148A, 148B, 148C, and 148D.) The reflected signals 148 (e.g., 148A, 148B, 148C, and 148D in FIG. 2) may add constructively at some distances between the targets 130 and the system 100 and destructively at others. In the high-level, conceptual illustration of FIG. 2, the echo signal 142 has three distinct attenuated and distorted reflections, but they are obscured by noise. Each of these reflections corresponds to at least one target 130 at some distance from the system 100. One objective of the system 100 is to estimate the distances 150 at which at least one target 130 resides from the noisy echo signal 142.

The time between when the transmitted waveform 140 is launched and the echo signal 142 is received allows the distance 150 to be calculated because the signals travel with a known speed (e.g., the speed of light when the medium is air). The distance 150 between the target 130 and the system 100, which can be computed from the measured propagation time, provides a circle, centered at the system 100's position, on which the target 130 lies.

In accordance with some embodiments disclosed herein, the receiver 120 processes the echo signal 142 using an optimization procedure to obtain a denoised signal 144. The receiver 120 then uses the denoised signal 144 to estimate the distances 150 from the system 100 at which targets 130 are positioned. As discussed further below, the use of the denoised signal 144 to estimate the ranges of the targets 130 can improve the performance of the system 100 substantially with respect to conventional system (e.g., by improving the SNR by 10-12 dB or more).

FIG. 2 illustrates the denoising procedure at a high level. The receiver 120 performs an optimization procedure, described in more detail below, using the echo signal 142, to obtain the denoised signal 144. The optimization procedure takes advantage of the knowledge that the ideal echo signal 142 (absent noise) is a structured signal that is the superposition of a relatively small number of time-shifted and attenuated copies of the transmitted waveform 140, even though the time-shifts and attenuations are unknown. The optimization denoises the signal in such a way that the resulting denoised signal 144 looks like the linear superposition of a few number of time-shifted and attenuated transmitted waveforms 140, while still being "close" to the received echo signal 142. The receiver 120 then uses the resulting denoised signal 144 to estimate the distances 150 from the system 100 at which targets 130 reside. In some embodiments, to estimate the distances 150, the receiver 120 performs a correlation of the transmitted waveform 140 and the denoised signal 144, and then uses the positions of peaks in the correlation result to estimate the distances 150. As discussed in further detail below, the correlation may be performed in the time domain or by performing an equivalent procedure in the frequency domain. FIG. 2 provides a conceptual illustration of the post-correlation signal 146, which is shown as having peaks at times t1, t2, and t3. Using the speed at which the transmitted signal 140 and the reflected signals 148 propagate through the medium, the distances 150 can be estimated from the positions of the peaks in the post-correlation signal 146.

As illustrated in FIG. 2, the number of peaks in the post-correlation signal may not be the same as the number of targets 130. For example, if multiple targets 130 are substantially equidistant from the system 100, their reflected signals 148 will arrive at substantially the same time at the receiver 120. Referring again to FIG. 1, the targets 130A and 130B are approximately the same distance from the system 100 (e.g., the distance 150A is approximately the same as the distance 150B). Thus, their reflected signals 148A and 148B arrive at the receiver 120 at approximately the same time. In FIG. 2, the reflected signals 148A and 148B correspond to the first "bump" (obscured by noise) in the echo signal 142. As this example illustrates, the receiver 120 can identify, from the post-correlation signal 146, that there is at least one target 130 at the distance 150 corresponding to the peak at time t1, but may not be able to identify, solely from the post-correlation signal 146, how many targets are at that distance 150.

Figure 3A:
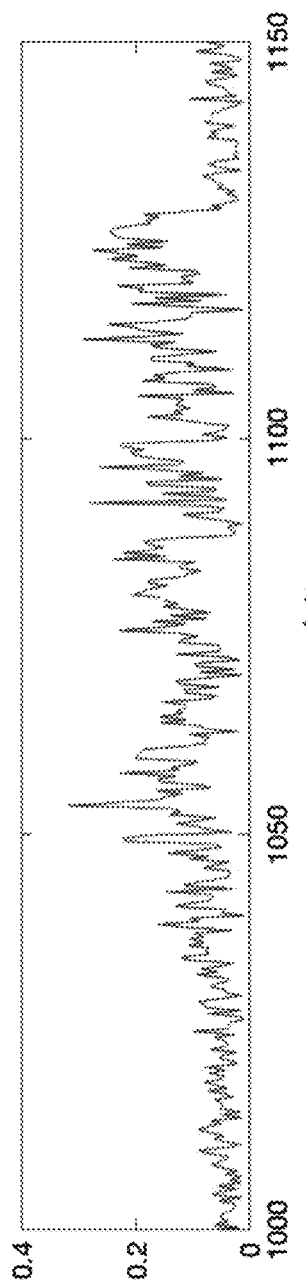
FIGS. 3A through 3C illustrate one performance benefit in accordance with some embodiments.
Figure 3B:
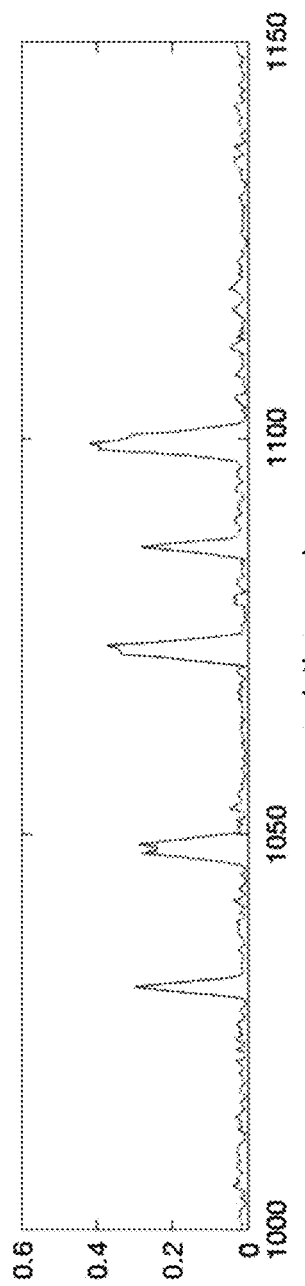
Figure 3C:
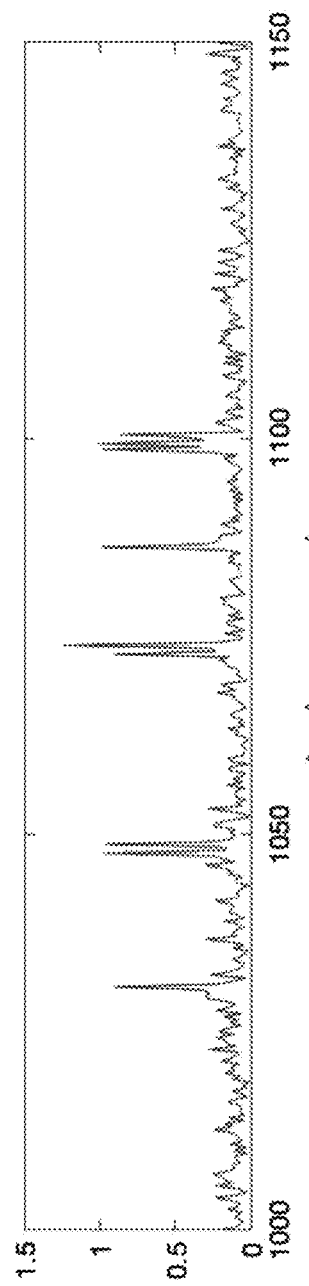

FIGS. 3A through 3C illustrate some of the benefits of performing an optimization procedure to obtain the denoised signal as disclosed herein. The top plot, FIG. 3A, illustrates the received echo signal 142. As shown, there are no discernible peaks in the echo signal 142. The middle plot, FIG. 3B, shows the result of correlating the echo signal 142 with the transmitted waveform 140. Based on the output of the correlation operation (e.g., correlation receiver), one would likely conclude that there are targets 130 at five distances 150, corresponding to the five peaks shown in FIG. 3B. The bottom plot, FIG. 3C, shows the result of the correlation operation when, in accordance with some embodiments, an optimization procedure is performed to obtain a denoised signal before performing the correlation operation. As FIG. 3C illustrates, there are actually targets 130 at more than five distances. The post-correlation signal 146 in the bottom plot has nine peaks. Thus, the use of an optimization procedure as disclosed herein allows the system 100 to provide improved range accuracy and range resolution (the ability to resolve targets 130 that are close to each other).

In some embodiments, the system 100 includes multiple receiver sensors (e.g., an antenna array), each of which receives a respective echo signal 142. In some such embodiments, in addition to (or instead of) using the echo signal 142 to estimate the distances 150 of targets 130 from the system 100, the receiver 120 processes multiple echo signals 142 to determine the angles of arrival of the targets 130. This procedure is described in further detail below.

In some embodiments in which the system 100 includes multiple receiver sensors, the system 100 also or alternatively estimates the speed at which the targets 130 are moving and/or their velocities (speed and direction). This procedure is also described in further detail below.

Transmitter

Figure 4:
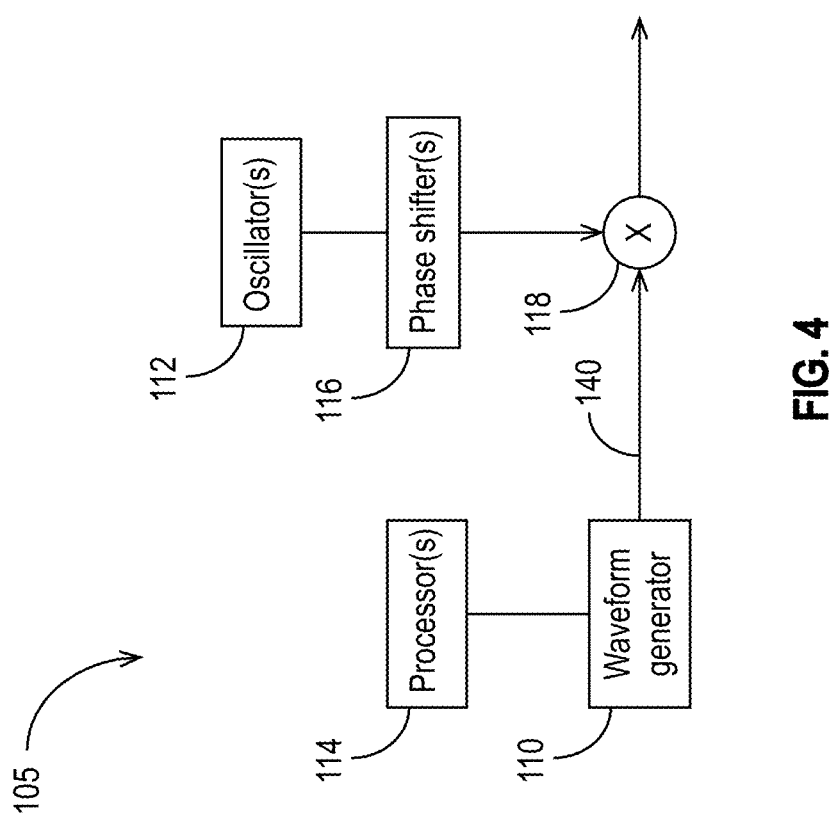
FIG. 4 illustrates a transmitter in accordance with some embodiments.

FIG. 4 illustrates certain components of a transmitter 105 of a system 100 in accordance with some embodiments. The transmitter 105 comprises a waveform generator 110 and other components for transmitting the transmitted waveform 140. The transmitted waveform 140 may be any suitable waveform. For example, the transmitted waveform 140 may comprise a train of pulses, each pulse having a specified duration or different pulses having different durations. Preferably, the transmitted waveform 140 has good autocorrelation properties, meaning that the autocorrelation is small except near the origin. The better the autocorrelation properties, the better the performance of the correlation receiver, discussed below. To probe targets in an area, a transmitted waveform 140 may be comprised of one or more pulses having a first, short duration, and, to probe targets that are further away, one or more pulses having a second, longer duration. The embodiments herein are presented in the context of pulsed array processing, but it is to be understood that the principles disclosed can be applied to continuous-wave (CW)-types of systems (e.g., radar systems) as well.

The transmitter 105 may modulate the transmitted waveform 140 onto one or more carrier signals. For example, in the exemplary embodiment shown in FIG. 4, the waveform generator 110 is coupled to a mixer 118. The mixer 118 modulates the transmitted waveform 140 onto a carrier signal.

Figure 5:
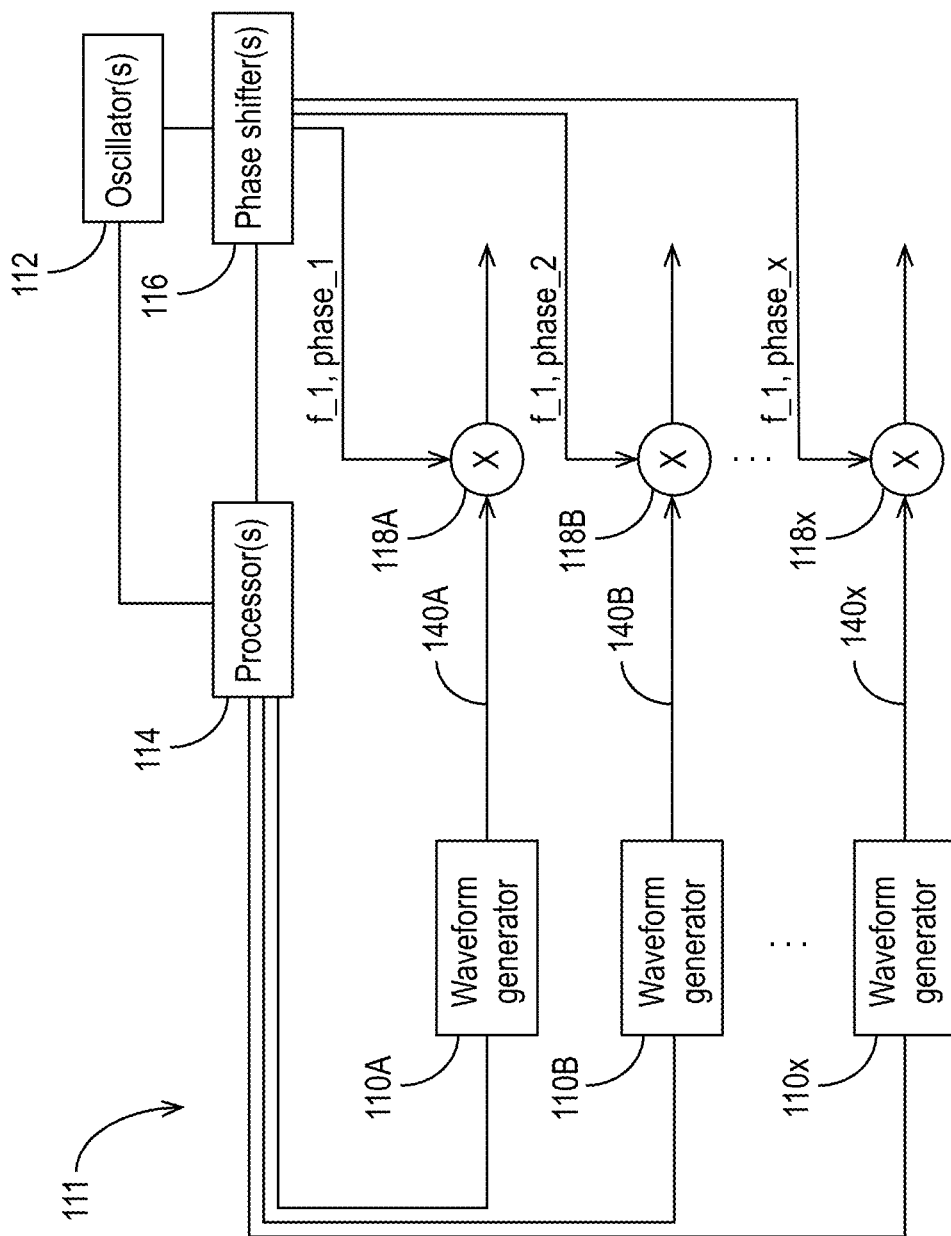
FIG. 5 illustrates certain components of the transmitting portion of a system in accordance with some embodiments.

The frequency of the carrier signal may remain the same, or it may be different at different times. Likewise, the phase of the carrier signal may be constant, or it may change. As shown in FIG. 5, the carrier signal may be generated by one or more oscillators 112, and its phase may be generated by one or more phase shifters 116. One or more processors 114 may control the oscillator(s) 112 and/or the phase shifter(s) 116.

In some embodiments, the system 100 is capable of transmitting in multiple frequency bands (e.g., in two or more of the X-, C-, S-bands). In such embodiments, the same transmitted waveform 140 may be transmitted in multiple frequency bands, or different transmitted waveforms 140 may be transmitted in different frequency bands (e.g., a first transmitted waveform 140 may be transmitted in a first frequency band, and a second transmitted waveform 140 may be transmitted in a second frequency band).

In some embodiments, the transmitting portion of the system 100 comprises a transmitter array 111. FIG. 5 illustrates certain components of a transmitter array 111 of a system 100 in accordance with some embodiments. The transmitter array 111 comprises waveform generators 110A, 110B, . . . , 110x and other components for transmitting instances of the transmitted waveforms 140A, 140B, . . . 140x, where "x" represents the number of waveform generators 110 and waveforms 140. It is to be understood that at every instant in time the transmitted waveforms 140A, 140B, . . . , 140x are identical to each other. Thus, if multiple waveform generators 110A, 110B, . . . , 110x are active, they are generating the same physical transmitted waveform 140, but each waveform generator 110A, 110B, . . . , 110x may generate the transmitted waveform 140 independently from other waveform generators 110.

The transmitted waveform 140 may be any suitable waveform. For example, the transmitted waveform 140 may comprise a train of pulses, each pulse having a specified duration or different pulses having different durations. Preferably, the transmitted waveform 140 has good autocorrelation properties, meaning that the autocorrelation is small except near the origin. The better the autocorrelation properties, the better the performance of the correlation receiver, discussed below. To probe targets in an area, a transmitted waveform 140 may be comprised of one or more pulses having a first, short duration, and, to probe targets that are further away, one or more pulses having a second, longer duration. The embodiments herein are presented in the context of pulsed array processing, but it is to be understood that the principles disclosed can be applied to continuous-wave (CW)-types of systems (e.g., radar systems) as well.

The transmitter array 111 may modulate each instance of the transmitted waveform 140 onto one or more carrier signals. For example, in the exemplary embodiment shown in FIG. 5, each of the waveform generators 110 shown is coupled to a respective mixer 118 (i.e., waveform generator 110A is coupled to mixer 118A, waveform generator 110B is coupled to mixer 118B, etc.). The mixers 118 modulate the instances of the transmitted waveform 140 onto the carrier signals. At any particular time, each carrier signal has the same frequency, but each instance of the transmitted waveform 140 corresponding to a particular waveform generator 110 is modulated onto a carrier signal that has a different phase from the carrier signals onto which all other instances of the transmitted waveform 140 are modulated. For example, as shown in FIG. 5, the instances of the transmitted waveform 140A is modulated onto a carrier signal having a frequency "f_1" and a phase "phase_1," the instance of the transmitted waveform 140B is modulated onto a carrier signal having the same frequency "f_1" but a different phase, "phase_2," etc.

The carrier frequency of each carrier signal may remain the same, or it may be different at different times. Likewise, the phase of each carrier signal may be constant, or it may change. As shown in FIG. 5, the carrier signals may be generated by one or more oscillators 112, and the various phases for the carrier signals for the waveform generator(s) 110 may be generated by one or more phase shifters 116. One or more processors 114 may control the oscillator(s) 112 and/or the phase shifter(s) 116.

In some embodiments, the system 100 is capable of transmitting simultaneously in multiple frequency bands (e.g., in two or more of the X-, C-, S-bands at the same time). In such embodiments, the same transmitted waveform 140 may be transmitted simultaneously in multiple frequency bands, or different transmitted waveforms 140 may be transmitted in different frequency bands (e.g., a first transmitted waveform 140 may be transmitted in a first frequency band, and a second transmitted waveform 140 may be transmitted in a second frequency band). At any particular time, each carrier signal within a particular frequency band in use has the same frequency, but each instance of the transmitted waveform 140 corresponding to a particular waveform generator 110 transmitting within that band is modulated onto a carrier signal that has a different phase from the carrier signals onto which all other instances of the transmitted waveform 140 are modulated by other waveform generators 110 transmitting within that band.

Without loss of generality, we assume there are P waveform generators 110 in a transmitter array 111. Although all P of the waveform generators 110 in a transmitter array 111 are able to transmit simultaneously, in some embodiments having a transmitter array 111, fewer than all of the P waveform generators 110 in the array 111 transmit at the same time. Moreover, the number of waveform generators 110 may be greater than, less than, or equal to the number of receiver sensors 122 (described below).

In some embodiments, a transmitter array 111 transmits an (up to) P-dimensional sensing vector. The sensing vector is the result of each waveform generator 110 generating a transmit waveform 140 (e.g., a pulse, a train of pulses, etc.) that is modulated onto a carrier signal having a particular carrier frequency, which is the same for all of the waveform generators 110 in the array. Preferably, the phases of the carrier signals transmitted by the (up to) P waveform generators 110 are different from one another. In some embodiments, the phases are randomly selected. For example, they could be truly random and changing as time proceeds, or they could be truly random and fixed for all time. Alternatively, they could be deterministic and selected according to some algorithm or criterion, potentially in coordination with the one or more processors 114. The objective of transmitting modulated carrier signals having different phases is to send energy into many directions at once. The different phases of the transmitted modulated carrier signals affect the amplitude and phase of the echo signal(s) 142 received by the receiver sensor(s) 122 (discussed below). In embodiments in which the system 100 includes multiple receivers (e.g., multiple receiver sensors 122), the differences in the amplitude and phase of each received echo signal 142 may be used to determine the angles of arrival of the sensed targets 130.

It is to be understood that in embodiments using random or multiple carrier signal phases, the randomness or variability in the phases of the carrier signals is in the spatial sense. Each waveform generator 110 transmits the same average energy when the transmit waveforms 140 modulated onto the carrier signals are the same.

In some embodiments in which the system 100 comprises an array of P waveform generators 110, different subsets of the P waveform generators 110 transmit at different times. In some embodiments, the active waveform generators 110 transmit the same amounts of energy. Over time, the process of changing the subsets of active waveform generators 110 creates a randomized antenna gain pattern that is suitable to probe a three-dimensional environment.

Referring again to FIG. 5, the transmitter array 111 includes at least a first waveform generator 110A and a second waveform generator 110B. The first waveform generator 110A generates, for a time period, a first instance (140A) of the transmitted waveform 140, which is modulated onto a first carrier signal that has a specified carrier frequency and a first phase. The second waveform generator 110B generates, during the same time period and substantially synchronously with the first waveform generator 110A, a second instance (140B) of the transmitted waveform 140, which is modulated onto a second carrier signal that has the same specified carrier frequency but a second phase that is different from the first phase. The first and second phases may be randomly selected, or they may be deterministic. For example, the first and second phases may be selected as the result of a randomization procedure (e.g., using a pseudo-random sequence generator to determine randomized first and second phases, etc.). As another example, the first and second phases may be deterministic meaning that they are selected according to an algorithm known to the first and second transmitters (e.g., a deterministic sequence through which the first and second phases are selected and/or changed as the system operates, e.g., by selecting a pre-defined phase from a look-up table, etc.).

The first and second waveform generators 110A, 110B may include or may be coupled to at least one processor 114 that is configured to execute at least one machine-executable instruction. As a result of executing the at least one machine-executable instruction, the at least one processor 114 may determine or choose the first and second phases (which, as explained above, may be implemented using the oscillator(s) 112 and phase shifter(s) 116).

In some embodiments in which the first and second waveform generators 110A, 110B include or are coupled to at least one processor 114, that at least one processor 114 controls one or more characteristics of the signals transmitted by the first and second waveform generators 110A, 110B. For example, the at least one processor 114 can control the shape and/or timing and/or duration of the transmit waveform(s) 140 modulated onto carrier signal(s) by each of the first and second waveform generators 110A, 110B. The at least one processor 114 may also, or alternatively, be able to control (either directly or in cooperation with other waveform generator 110 components that are well known to those of ordinary skill in the art) some aspect of the carrier signals, such as, for example, the carrier frequency, amplitude, and/or, as explained above, phase.

Thus, in some embodiments, the machine-executable instruction(s) cause the at least one processor 114 to instruct the first waveform generator 110A to transmit, for a first time period, a first transmit waveform 140 modulated onto a first carrier signal having a first carrier frequency and a first phase, and, at another time, for a second time period, a second transmit waveform 140 modulated onto a second carrier signal having a second carrier frequency and a second phase. In such embodiments, the first and second waveforms 140 can be the same or different. Similarly, the first and second carrier frequencies can be the same or different. Likewise, the first and second phases can be the same or different.

Similarly, in some embodiments, the machine-executable instruction(s) cause the at least one processor to instruct the second waveform generator 110B to transmit, for the first time period and substantially synchronously with the first transmitter, a third waveform 140 modulated onto a third carrier signal having a third carrier frequency and a third phase, and, at another time, for the second time period, a fourth waveform 140 modulated onto a fourth carrier signal having a fourth carrier frequency and a fourth phase. In such embodiments, the third and fourth waveforms 140 can be the same as or different from each other. Preferably, the third waveform 140 is substantially the same as the first waveform 140, and the fourth waveform 140 is substantially the same as the second waveform 140. Similarly, the third and fourth carrier frequencies can be the same as or different from each other. Preferably, the third carrier frequency is substantially the same as the first carrier frequency, and the fourth carrier frequency is substantially the same as the second carrier frequency. Likewise, the third and fourth phases can be the same as or different from each other. Preferably, the third phase is different from the first phase, and the fourth phase is different from the second phase.

The system may include other waveform generators 110 in addition to the first and second waveform generators 110A, 110B, as shown in FIG. 5. In such embodiments, each additional waveform generator 110x transmits, during the same time period and substantially synchronously with the first and second waveform generator 110A, 110B, a respective instance of the transmit waveform 140 modulated onto a respective carrier signal that has the same carrier frequency as the first and second carrier signals but a respective phase. Each waveform generator 110 transmits a modulated carrier signal that has a phase that is different from every other modulated carrier signal's phase and different from both of the first and second phases. In some embodiments, each of the respective instances of the transmitted waveform 140 is substantially identical to the first and second instances of the transmitted waveform 140.

Like the first and second phases, the third and fourth phases may be randomly selected, or they may be deterministic. For example, the third and fourth phases may be selected as the result of a randomization procedure (e.g., using a pseudo-random sequence generator to determine randomized third and fourth phases, etc.). As another example, the third and fourth phases may be deterministic as described above.

In embodiments in which the first and second waveform generators 110A, 110B include or are coupled to at least one processor 114 that is configured to execute at least one machine-executable instruction, the at least one processor 114 may determine or choose the first and second phases as a result of executing the at least one machine-executable instruction.

Receiver

Referring again to FIG. 1, the system 100 also includes at least one receiver 120. FIG. 6 is a high-level block diagram of a receiver 120 in accordance with some embodiments. The receiver 120 includes at least one sensor 122, at least one radio-frequency (RF)/analog (e.g., downconversion) circuit 124, at least one analog-to-digital converter (ADC) 126, and at least one processor 128. It is to be understood that the at least one receiver 120 may include components that are not illustrated in FIG. 6. As just one example, the at least one receiver 120 may include memory, and this memory may be coupled to the at least one processor 128 and/or the at least one ADC 126.

Each sensor 122 may comprise, for example, an antenna. In some embodiments, the sensor(s) 122 are capable of receiving signals in at least two frequency bands (e.g., more than one of the X-, C-, S-bands). Such sensor(s) 122 may be capable of receiving signals in more than one band at the same time.

Each RF/analog circuit 124 may be any conventional RF/analog circuit 124, which circuits are familiar to and well known by those having ordinary skill in the art. In some embodiments, each RF/analog circuit 124 downconverts a respective received echo signal 142 to baseband. In such embodiments, the at least one ADC 126 is configured to generate a set of in-phase (I) and quadrature (Q) samples of the echo signal 142 for further processing by the receiver 120. In other embodiments, each RF/analog circuit 124 is configured to downconvert a respective echo signal 142 to an intermediate frequency, and the ADC is configured to sample the echo signal 142 while it resides at the intermediate frequency. Still other embodiments do not include any RF/analog circuit 124, in which case the ADC samples the echo signal 142 directly, without any downconversion.

The term "analog-to-digital converter (ADC)" is used broadly to mean any component that converts the continuous-time, continuous-amplitude (analog) received echo signal(s) 142 to discrete-time, discrete-amplitude (digital) signals (e.g., samples). Such components are well known to those having ordinary skill in the art and are not discussed further herein.

FIG. 7 illustrates an embodiment comprising multiple sensors 122 included in a sensor array 121 (e.g., an antenna array). In the embodiment shown in FIG. 7, a first sensor 122, labeled "Sensor 1," is coupled to a first RF/analog circuit 124, labeled "RF/analog 1," which is coupled to a first ADC 126, labeled "ADC 1," which is coupled to one or more processors 128. Similarly, a second sensor 122, labeled "Sensor 2," is coupled to a second RF/analog circuit 124, labeled "RF/analog 2," which is coupled to a second ADC 126, labeled "ADC 2," which is coupled to the one or more processors 128. As shown in FIG. 7, the receiver 120 can also include additional sensors 122, RF/analog circuits 124, and ADCs 126. As explained above, the RF/analog circuits 124 and the ADCs 126 are well known in the art. As also explained above, some embodiments do not include the RF/analog circuits 124.

In embodiments including multiple sensors 122, as explained previously, the sensors 122 need not be collocated (although they can be). Moreover, in embodiments that include three or more sensors 122, the sensors 122 need not be collinear (although they can be). Furthermore, the sensors 122 do not need to be disposed in any regular manner or with any particular spacing between them. For example, unlike in conventional systems, the distances between adjacent sensors 122 in a sensor array 121 need not be the same (although it can be).

The sensor(s) 122 (e.g., shown in FIG. 6 and FIG. 7) may be collocated with the waveform generator(s) 110 (e.g., shown in FIG. 5). In some embodiments, the waveform generator(s) 110 use the sensor(s) 122 to transmit signals. For example, the waveform generator(s) 110 and receiver(s) 120 can share some or all of the sensors 122 in a sensor array 121 (e.g., an antenna array). In embodiments in which at least some of the sensors 122 are collocated with at least some of the waveform generator 110, the at least one processor 128 (e.g., shown in FIG. 6 and FIG. 7) and the at least one processor 114 (e.g., shown in FIG. 5) may be the same at least one processor. In other words, a set of one or more processors 114/128 may be configured to coordinate and manage the system 100's transmit and receive operations.

In some embodiments, after transmission by the waveform generator(s) 110 of the transmit waveform(s) 140 (e.g., a wide beam), there is a listening period during which the at least one receiver 120 listens for the echo signal(s) 142. As explained above, in some embodiments, one or more waveform generator(s) 110 share an antenna (e.g., one of the sensors 122) with one or more receiver(s) 120. In some such embodiments, if fewer than all waveform generators 110 are transmitting, these shared antennas may be used by the one or more receiver(s) 120 to detect echo signals 142 while other antennas are being used by the one or more waveform generator(s) 110. It is to be understood that the number of antennas used by the waveform generator(s) 110 may be the same as or different from the number of sensors 122 used by the receiver 120.

Overview of Target Detection Procedures

Figure 8:
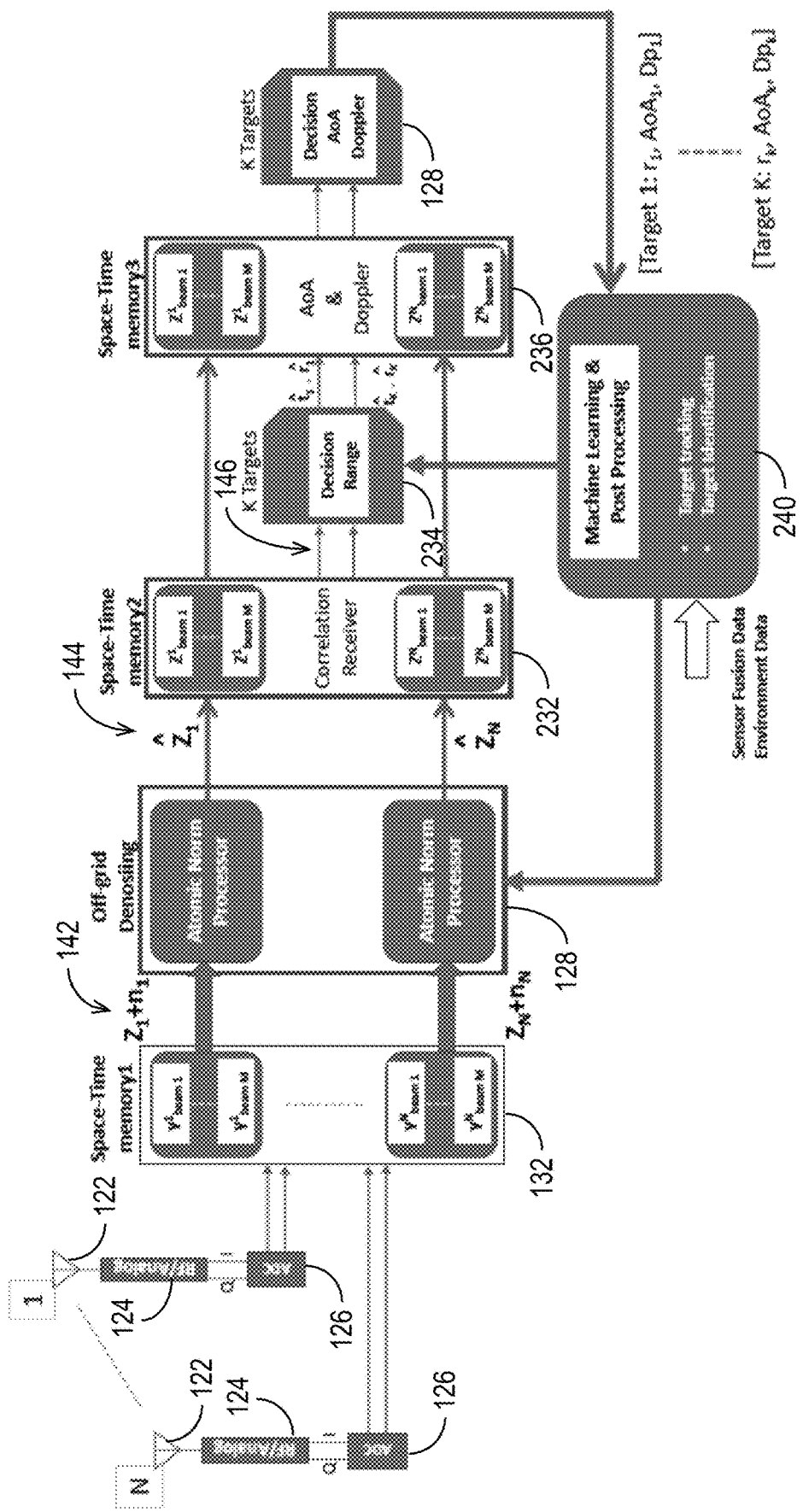
FIG. 8 is a block diagram of the signal flow in the receiver in accordance with some embodiments that include a sensor array.

FIG. 8 is a conceptual block diagram of the signal flow in the receiver 120 in accordance with some embodiments that include a sensor array 121. In the exemplary embodiment of FIG. 8, the receiver 120 includes N sensors 122. Each of the N sensors 122, which receives a respective echo signal 142, is coupled to a respective RF/analog circuit 124, and each RF/analog circuit 124 is coupled to a respective ADC 126. As explained above, the RF/analog circuits 124 and ADCs 126 are conventional and are not described further. Thus, the explanation below focuses on the processing of discrete-time signals after the ADCs 126.

As shown in FIG. 8, for each sensor 122, samples of the received echo signal 142 from the respective ADC 126 (presumed in this exemplary embodiment to generate in-phase (I) and quadrature (Q) samples of the received echo signal 142) are (optionally) placed in a memory 132, which may be any suitable type of memory (e.g., SRAM, DRAM, dual-port RAM, etc.). The memory 132 may be internal or external to the at least one processor 128. In embodiments in which the memory 132 is external, the memory 132 may be accessed using any suitable protocol (e.g., PCI3, 10G SerDes, etc.), as will be known to those having ordinary skill in the art.

The samples of the echo signal 142 may then be organized in column vector from the output of each ADC 126 for each channel (e.g., I-channel and Q-channel) and sequenced in time. In the illustrated embodiment, for each sensor 122, the I and Q samples may be used to construct complex-valued samples. The at least one processor 128 may then process the samples of the received echo signal 142 to determine the distances 150, and/or the number of targets 130 at each of the distances 150, and/or the angles of arrival of each of the targets 130, and/or the speed and/or direction at which the detected targets 130 are moving.

As described in further detail below, the receiver 120 knows the transmitted (time-domain) waveform 140 and knows when it was transmitted, and it can use an optimization procedure to obtain a denoised signal 144 for every sensor 122. For example, the at least one processor 128 may perform the optimization procedure to obtain the denoised signal 144. The denoised signal 144, which may be a discrete-time or continuous-time signal, is a superposition of a small number of scaled and time-delayed versions of the transmitted waveform 140. The optimization procedure, described in detail below, can be done for every sensor 122 and for every beam, as shown in FIG. 8.

The denoised signals can then be used to estimate the distances 150 of the targets 130 from the system 100. In some embodiments, for some or all of the sensors 122, the receiver 120 separately performs a correlation of the transmitted waveform 140 and the denoised signal for the respective sensor 122 (performed by the block labeled "Correlation Receiver" in FIG. 8). A correlation receiver may correlate the transmitted waveform 140 with the denoised signal 144 in a sliding window fashion, and the round-trip travel time of the signal can be inferred from the peaks of this correlation operation. (Alternatively, one can use methods such as Hankel norm approximation to estimate the round-trip times). This procedure can be performed for every sensor 122 and every beam, separately. It is assumed that the targets 130 are far enough away from the system 100 that the round-trip times of the echo signals 142 should be approximately identical for every sensor 122 and every beam (because they only depend on the distance 150 between the target 130 and the system 100). Due to noise, however, the estimated round-trip times will have some (slight) differences. A clustering algorithm, such as K-means, can be used to find the average value of the round-trip time for each echo signal 142. In FIG. 8, these operations occur in the Correlation Receiver and Decision Range Units shown, which may be implemented by the at least one processor 128. The distances 150 between the system 100 and the targets 130 can be computed from the corresponding round-trip times.

An array signal can be constructed for each of the estimated ranges at which there are targets 130. For example, the at least one processor 128 can organize samples of the denoised signals (which, if the denoised signals are discrete-time signals, may be some or all of the samples of the denoised signals) to form the array signal. The result is a vector whose dimension is the number of sensors N multiplied by the number of beams M. This array signal is then fed to another Atomic Norm Processor (e.g., implemented by the at least one processor 128) that determines the angles of arrival (AoA) of the targets 130, as well as their respective Doppler shifts, as described below in further detail.

In some embodiments in which the receiver 120 performs a first optimization procedure to determine the target 130 ranges and a second optimization procedure to determine the angles of arrival of the target(s) 130, for each of the range values, the at least one processor 128 constructs an array signal from samples of the denoised signal 144 from each of at least two sensors 122. For example, in some embodiments, the at least one processor 128 constructs an array with a number of rows corresponding to the number of sensors 122 multiplied by the number of beams, and a number of columns corresponding to the number of peaks in the denoised signals 144. To fill in the array, for each sensor 122 and each beam, the at least one processor 128 can sample the post-correlation signal 146 at its peaks and place these samples into the rows of the array. With such an exemplary structure of the array, if all of the sensors 122 detect the same number of ranges at which there are targets 130, all of the samples in each column of the array correspond to one of the ranges at which the sensors 122 detected at least one target 150. The at least one processor 128 can then process the columns of the array separately to determine the angles of arrival of the target(s) at each range.

In some embodiments in which the ranges of the targets 150 are not determined using an optimization procedure and denoised signal(s) as described herein, for each of the range values, the at least one processor 128 constructs an array signal using samples of the echo signals 142 received at different sensors 122. Using the array signal, the at least one processor 128 then performs another optimization procedure to estimate a respective angle of arrival for each target 130 estimated to be at the distance 150 corresponding to the range value. In some embodiments, as described above, the optimization procedure performed for angle-of-arrival estimation comprises obtaining a denoised array signal and applying an angle-of-arrival estimation algorithm to the denoised array signal.

The denoised array signal can be obtained in various ways. For example, in some embodiments, the denoised array signal is obtained by minimizing an atomic norm of the denoised array signal subject to a constraint on a metric characterizing the closeness of the denoised array signal to the array signal. As used herein, "closeness" means how well the denoised signal 144 corresponds to the echo signal 142. Metrics characterizing the closeness of two signals are well known in the art and include not only metrics based on Euclidean distances (e.g., squared Euclidean distance, $L^1$ norm, $L^\infty$, etc.). For example, squared Euclidean distance may be useful when noise is Gaussian, but also information-theoretic metrics (e.g., using Kullback-Liebler (KL) divergence, etc.), which may be useful when the noise is not Gaussian.

As another example, in some embodiments, the denoised array signal is obtained by minimizing a metric characterizing the closeness of the denoised array signal to the array signal subject to a constraint on an atomic norm of the denoised array signal. As yet another example, in some embodiments, the denoised array signal is obtained by minimizing a weighted sum of (a) a metric characterizing the closeness of the denoised array signal to the array signal, and (b) an atomic norm of the respective denoised array signal.

In some embodiments, the atomic norm corresponds to a collection of atoms, wherein each atom is a planar wave with a respective arrival angle that differs from the respective arrival angle of every other atom.

As will be understood by those having ordinary skill in the art, estimation of the angle of arrival of a particular target 130 uses the denoised array signal of at least two receiver sensor 122 echo signals 142 reflected by that target 130. The angle of arrival estimation algorithm can be any suitable algorithm or technique for estimating angles of arrival, such as, for example, a Hankel norm approximation, the multiple signal classification (MUSIC) algorithm, estimation of signal parameters via rotational invariance technique (ES- PRIT), or Prony's method. Other algorithms may also be suitable, as will be appreciated by those having ordinary skill in the art, and the examples provided herein are not intended to be limiting.

The resulting estimated round-trip times (or distances 150), AoA, and Doppler shifts of the various targets 130 may then optionally be sent to a Machine Learning and Post Processing Unit, which uses this information for target identification and tracking, scene understanding, etc. This unit can also fuse data from other sensors 122 and can give feedback to the various units described earlier. The Machine Learning and Post Processing Unit may be implemented by the at least one processor 128.

An example implementation is now described. Assume an ADC sample rate of 10 million samples per second, generating 10 bits every 0.1 microsecond (μs). Assume the number of sensors 122 in the receiver 120 is 8. If the transmitted waveform 140 is a pulse of length 1 μs, and the transmitter(s) 110 send four probing beams, then the receiver collects echoes from each of the beams first. After each transmit beam, there is a listening period, and say it is 4 μs. The transmitted waveform 140 (assumed to be pulse in this example) represents a bit sequence having good correlation properties (as described above).

In this example, the number of bits entering the Atomic Norm Processor per sensor 122 during the listening period (assumed to be 4 μs) is 2 (I and Q)×10,000,000 samples/s× 10 bits/sample×4 μs=800 bits/sensor. Thus, for all eight sensors, the total number of bits is 6400 per listening period.

Figure 9:
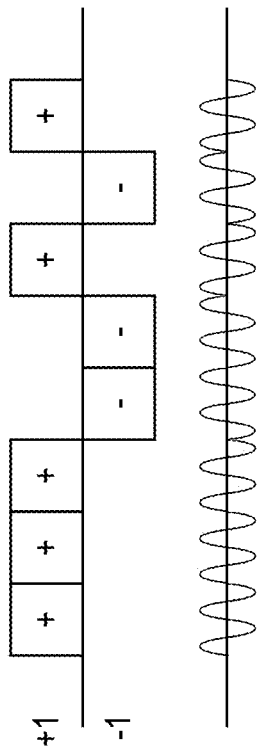
FIG. 9 illustrates an exemplary chip sequence in accordance with some embodiments.
Figure 10:
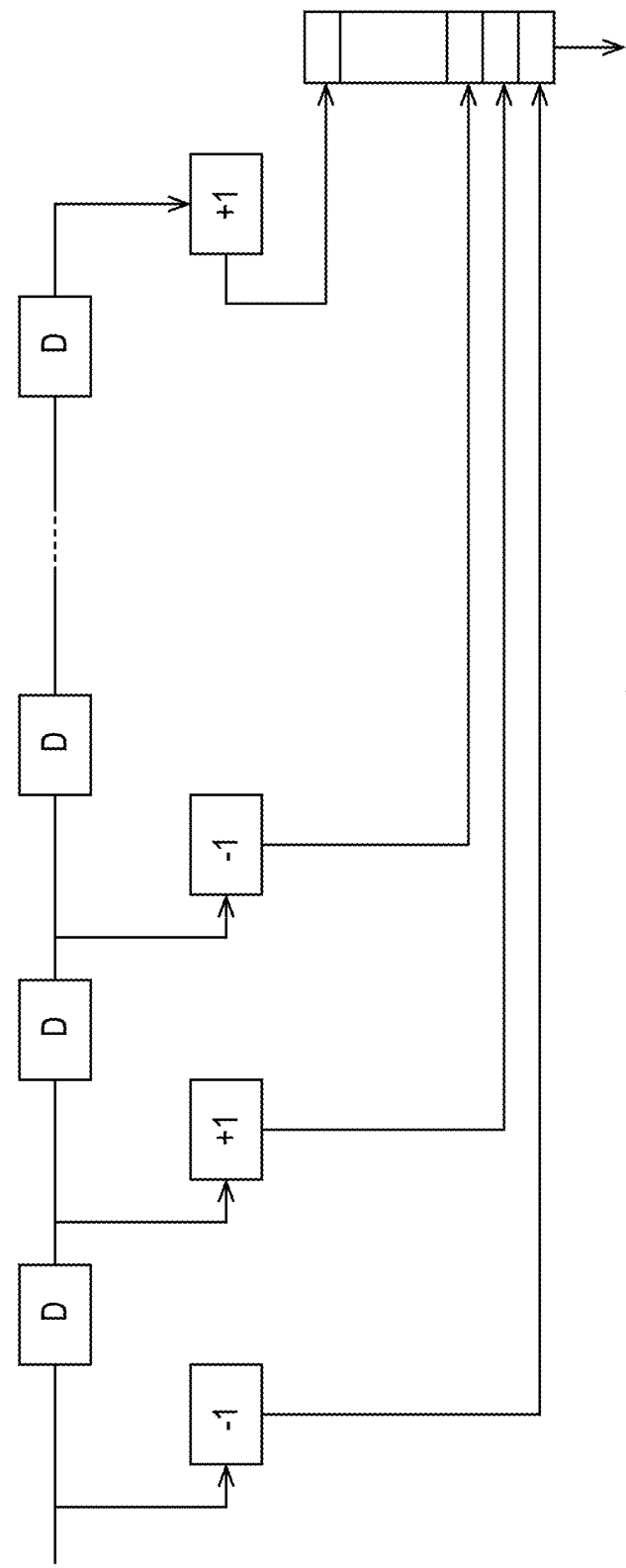
FIG. 10 illustrates an exemplary decoder for a chip sequence in accordance with some embodiments.

Referring to FIG. 8, in this example, after every 0.1 μs transmit period, a 10-bit sample enters a queue and they are placed next to each other. For a 4-μs listening period (receive window) there are 40 10-bit samples entering the queue for the I and Q channels, each forming a long vector of 400 bits for the I and Q channel, and this is done for each sensor 122 where observation is taking place. Thus, for sensor 1, the received vector is $y_1$, and the receiver 120 collects $y_{1I}$=400 bits and $y_{1Q}$=400 bits The correlation receiver is where the denoised signals arrive from the Atomic Norm Processor. The transmitted signal could have any bandwidth, but to stay consistent with current example, assume its bandwidth is 5 MHz, which means the carrier frequency (e.g., 10 GHz) will be phase modulated at 5 MHz. For a pulse length of 1 μs, and (for example) BPSK modulation (note that there are other types of signal modulations available to the transmitter such as LFM) we could have 50 bits (also known as "chips"). Arranging these chips in a certain sequence can produce a transmitted waveform 140 with a very sharp autocorrelation peak when integrated over the length of the sequence. FIG. 9 illustrates an exemplary chip sequence, and FIG. 10 illustrates an exemplary decoder for such a sequence.

The atomic norm is one example of a tool that can be used in the optimization procedures for estimating the round-trip times (and hence the ranges) of the targets 130, as well as the AoA and Doppler shifts of the targets 130.

The Atomic Norm

In the atomic norm framework used in accordance with some embodiments, we assume that we have a set of atoms $$\mathcal{A} = \{\eta_i\},$$

where the set may be finite, countably infinite, or even uncountably infinite We will call a signal x structured if it can be written as the sum of a few atoms, say K of them, where K is less than the dimension of the ambient space of x, i.e., $$x = \sum_{k=1}^{K} \alpha_k \eta_k.$$

In the above, the $\alpha_k$ are (possibly complex) scalars.

Herein, the atomic norm of a vector x, with respect to a set of atoms $\mathcal{A} = \{\eta_i\}$ is defined as $$\|x\|_{\mathcal{A}} = \begin{matrix} \min & \|c\|_1 \\ \text{subject to} & x = \sum_k c_k \eta_k \end{matrix}$$

In other words, the atomic norm of x is the most economical way that x can be expressed in terms of a linear combination of atoms, where by economical we mean the representation that minimizes the $\|\cdot\|$ norm, where $\|c\| = \Sigma_k |c_k|$. A small atomic norm means that x can be represented as the sum of a few atoms. Conversely, a large atomic norm means that many atoms are needed to represent x.

The Atomic Norm Framework for Ranging

Next, we describe the model and the assumptions that can be used to develop a suitable optimization procedure using the atomic norm to determine the distances 150.

A single sensor 122 can be used to estimate each of the distances 150 at which at least one target 130 is positioned. In embodiments having a sensor array 121, atomic norm methods may be used independently to process the echo signal 142 received by each sensor 122 in a receive sensor array 121 to estimate the distance(s) 150 between each of the sensors 122 and the target(s) 130. In other words, each sensor 122's received echo signal 142 may be processed independently of all other sensors' echo signals 142 to determine at what range(s) (distance(s) 150) there are targets 130 relative to that sensor 122.

We assume that there are K targets, and that they are stationary (they are not moving). We also assume that there is no multi-path. Thus, the only path from the transmitter 105 to the target 130 and to the receive sensor 122 is the line-of-sight (LOS) path.

The analysis presented below is for one receive sensor 122. When the receiver 120 includes a sensor array 121, the analysis below applies for each of the receive sensors 122 in the sensor array 121.

For ranging, the set of atoms is the set of all possible time-shifted versions of the transmitted waveform 140, which we denote by s(•). Thus, the set of atoms is:

$$\mathcal{A} = \{s(\cdot - \tau)\}.$$

Note that the set $\mathcal{A}$ is an uncountably infinite set since there is an atom for every time shift $\tau$. The reason for defining this set of atoms is that, as we shall momentarily see, when we have K targets, the received signal is a linear superposition of K such atoms.

More specifically, assuming that a transmitter array, in aggregate, transmits the temporal waveform s(•), then if there are K targets 130 in the scene, the received echo signal 142 at the sensor 122 being analyzed, for each beam, is:

$$y(t) = \sum_{k=1}^{K} \alpha_k s(t - t_k) + n(t),$$

where $\alpha_k$ is a complex number whose magnitude represents the strength of the reflection coming back from the k-th target 130 (which depends on the target distance 150, its cross-section, the material it is made of, the phases of the carrier frequencies, etc.), and whose phase carries the angle of arrival information (which we consider below), as well as the Doppler shift information (if the target 130 is moving), $t_k$ is the round-trip time to the k-th target 130 and back, and n(t) is the noise (which typically includes thermal noise, interference from exogenous signals being transmitted in the same frequency band, clutter, etc.). If the distance 150 to the k-th target is $d_k$, and the medium is air, the round-trip time is $$t_k = \frac{2d_k}{c},$$

where c is the speed of light. Thus, by estimating the $t_k$, the receiver 120 can estimate the ranges (distances 150) of the targets 130 from the receive sensor 122 (the $d_k$). Specifically, $$d_k = \frac{1}{2}ct_k.$$

Let the duration of time that the sensor listens be $T_{max}$. Without loss of generality, assume the sensor 122 listens during the interval $[0, T_{max}]$. Note that $T_{max}$ must be larger than the duration of the transmitted waveform s (•). Assuming the receiver 120 obtains (e.g., records) L samples of the echo signal y(t) during the interval $[0, T_{max}]$, then computing the L-point FFT of the L samples (after some reasonable approximations) yields $$Y_l = \sum_{k=1}^{K} \frac{\alpha_k}{T_{max}} e^{-j\frac{2\pi t_k}{T_{max}}l} \hat{S}\left(\frac{l}{T_{max}}\right) + N_l, l = 0, \ldots, L-1,$$

where $\hat{S}(f)$ is the Fourier transform of the waveform s(t) and $N_l$ is obtained from the L-point FFT of the noise samples.

As the equation above shows, in the frequency domain the received echo signal 142 is the sum of sinusoids with angles given by $$\theta_k = \frac{2\pi t_k}{T_{max}}.$$

Therefore, in some embodiments, the atomic norm can be applied in the frequency domain to estimate the $\theta_k$ and thereby the $t_k$ and $d_k$.

Examination of the equation for $Y_l$ shows that the L-point FFT of the received signal is a linear combination of a sum of sinusoids of the form $$\left\{ e^{-j\frac{2\pi t_k}{T_{max}}l}, l = 0, \ldots, L-1 \right\},$$

for different $t_k$. This suggests that in the frequency domain it will be useful to define the set of atoms as $$\mathcal{A} = \left\{ \begin{bmatrix} 1 \\ e^{-j\phi} \\ \vdots \\ e^{-j(L-1)\phi} \end{bmatrix}, -\pi < \phi \leq \pi \right\}.$$

Note that this is, once more, an uncountably infinite set. Written in vector form, the L-point FFT of the received samples can be written as $$\begin{bmatrix} Y_0 \\ Y_1 \\ \vdots \\ Y_{L-1} \end{bmatrix} = \begin{bmatrix} \hat{S}(0) & \cdots & 0 \\ \vdots & \ddots & \vdots \\ 0 & \cdots & \hat{S}\left(\frac{L-1}{T_{max}}\right) \end{bmatrix} \sum_{k=1}^{K} \frac{\alpha_k}{T_{max}} \begin{bmatrix} 1 \\ e^{-j\frac{2\pi t_k}{T_{max}}} \\ \vdots \\ e^{-j(L-1)\frac{2\pi t_k}{T_{max}}} \end{bmatrix} + \begin{bmatrix} N_0 \\ N \\ \vdots \\ N_{L-1} \end{bmatrix}.$$

This shows that the received samples can be viewed at the sum of K atoms $$z = \sum_{k=1}^{K} \frac{\alpha_k}{T_{max}} \begin{bmatrix} 1 \\ e^{-j\frac{2\pi t_k}{T_{max}}} \\ \vdots \\ e^{-j(L-1)\frac{2\pi t_k}{T_{max}}} \end{bmatrix}$$

multiplied by the known diagonal matrix $$D = \begin{bmatrix} \hat{S}(0) & \cdots & 0 \\ \vdots & \ddots & \vdots \\ 0 & \cdots & \hat{S}\left(\frac{L-1}{T_{max}}\right) \end{bmatrix}$$

In the frequency domain, this set of atoms is identical to the set of atoms that will be considered below for AoA estimation. Further, defining the vector of the L-point FFT of the received samples as $$y = \begin{bmatrix} Y_0 \\ Y_1 \\ \vdots \\ Y_{L-1} \end{bmatrix}$$

and the vector of the L-point FFT of the noise samples as $$n = \begin{bmatrix} N_0 \\ N \\ \vdots \\ N_{L-1} \end{bmatrix}$$

yields the following equation:

$$y = Dz + n.$$

The goal is thus to estimate the unknown signal z from knowledge of y and D (because the Fourier transform of the transmitted waveform is known), and the fact that z is the sum of a small number of atoms.

A thorough discussion of the atomic norm for the set of atoms consisting of discrete-time sinusoids will be provided below when we discuss the denoising for the AoA estimation. Here, we will summarize the results. The atomic norm for a given vector z can be shown to be given by $$\|z\|_{\mathcal{A}} = \text{Re}\lambda^* z \begin{cases} \max \\ \text{subject to} \quad \begin{bmatrix} 1 & \lambda^* \\ \lambda & e_1 e_1^T + M \end{bmatrix} \geq 0 \end{cases}$$

and the sums of the diagonals of M are zero The atomic norm can be used to denoise the unknown signal z to obtain the estimate $\hat{z}$.

Once $\hat{z}$ has been obtained, the ranges of the targets 130 can be found in a variety of ways. For example, one may compute the L-point FFT of $\hat{z}$ and use the peaks of the resulting signal to identify the frequencies $$\frac{2\pi t_k}{T_{max}}$$

and thereby the roundtrip times $t_k$ and the ranges $d_k$.

Equivalently, one may compute the denoised L-point FFT samples $\hat{y} = D\hat{z} + n$, take their inverse L-point FFT (to obtain the denoised samples), and apply the correlation receiver to the resulting denoised samples. The peaks of the output of the correlation received will yield estimates of the round-trip times $t_k$ and the ranges $d_k$.

Figure 11:
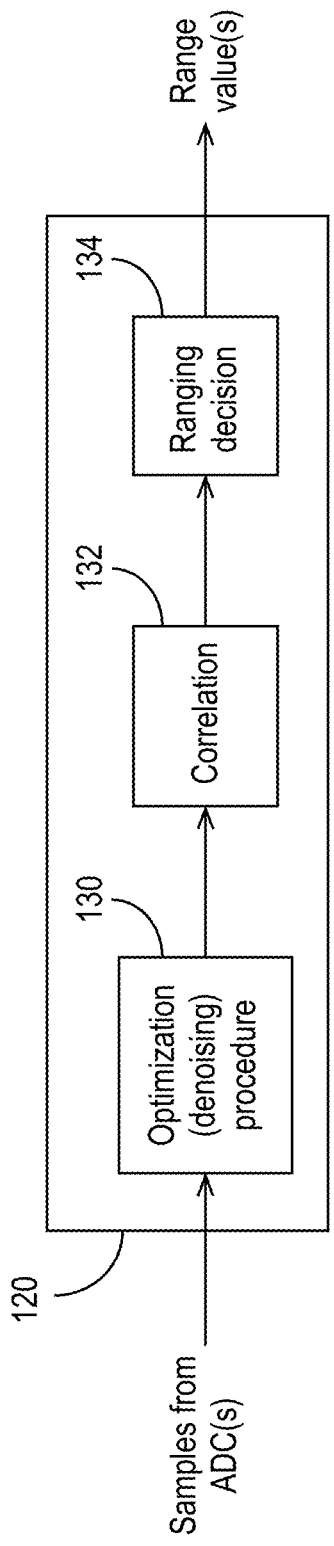
FIG. 11 illustrates operations that may be performed by the at least one processor to determine the target ranges for each receiver sensor in accordance with some embodiments.

FIG. 11 illustrates operations 220 that may be performed by the at least one processor 128 to determine the distances 150 for each receiver sensor 122 in accordance with some embodiments. In some embodiments, the operations 220 are carried out separately for each active receiver sensor 122. These operations 220 may be embodied in one or more machine-executable instructions executed by the at least one processor 128. Such machine-executable instructions may be obtained by compiling source code written in a programming language (e.g., C, C+, C++, etc.). The operations 220 shown in FIG. 11 may be, for example, subroutines or functions in a larger program executed by the at least one processor 128.

At block 230, the at least one processor 128 performs an optimization procedure, using at least a portion of the samples of the echo signal 142, to obtain a denoised signal 144. At block 232, the at least one processor 128 performs a correlation of the transmitted waveform 140 and the denoised signal 144 to obtain a post-correlation signal 146. At block 234, the at least one processor 128 uses the post-correlation signal 146 to determine at least one range value (distance). The at least one range value is an estimate of the distances 150 between the sensor 122 and at least one target 130 being detected. There may be multiple targets 130 at a particular distance 150. In some embodiments, a single range value corresponds to all targets 130 at that distance 150. In some embodiments, when different targets 130 are at different distances 150, the at least one range value comprises multiple range values, each corresponding to a different target 150 and a different distance 150.

The optimization procedure 230 may be any procedure that can create the denoised signal 144. In some embodiments, the optimization procedure comprises a projected gradient descent procedure (e.g., as discussed further below).

In some embodiments, as described further below, the optimization procedure 230 takes advantage of the structured nature of the echo signal 144 and uses the atomic norm in the optimization. For example, in some embodiments, the optimization procedure 230 minimizes an atomic norm of the denoised signal 144 subject to a constraint on a metric that characterizes a closeness of the denoised signal 144 to the samples of the echo signal 142. This procedure can be written as $$\begin{cases} \min & \|z\|_{\mathcal{A}} \\ \text{subject to} & \text{dist}(y, Dz) < \epsilon \end{cases}$$

where dist(y, Dz) represents the distance between the vectors y and Dz, and E is a prescribed tolerance.

As another example, in some embodiments, rather than minimizing the atomic norm itself, the optimization procedure 230 minimizes a metric characterizing a closeness of the denoised signal 144 to the samples of the echo signal 142 subject to a constraint on the atomic norm of the denoised signal 144. This procedure can be written as $$\begin{cases} \min & \text{dist}(y, Dz) \\ \text{subject to} & \|z\|_{\mathcal{A}} < \delta \end{cases}$$

where $\delta$ is now the prescribed tolerance.

As yet another example, in still other embodiments, the optimization procedure 230 minimizes a weighted sum of (a) a metric characterizing the closeness of the denoised signal 144 to the samples of the echo signal 144, and (b) an atomic norm of the denoised signal 144. This can be written as $$\min \text{dist}(y, Dz) + \lambda \|z\|_{\mathcal{A}}$$

where $\lambda > 0$ is a regularization parameter than determines the relative weight of minimizing the closeness (or distance) compared to minimizing the atomic norm.

When the squared Euclidean distance is used, i.e., when $\text{dist}(y, Dz) = \|y - Dz\|^2$, as shown further below, the third embodiment (of minimizing a weighted sum of the distance and atomic norm) reduces to the optimization $$\hat{z} = \left(\frac{\lambda}{4}\hat{T}^\dagger + D^* D\right)^{-1} D^* y$$

where $\hat{T}$ is a positive semi-definite Toeplitz matrix found from the optimization $$\hat{T} = \underset{T \geq 0}{\text{argmin}}\left[\lambda t_0 + y^*(I + DTD^*)^{-1} y\right]$$

where $t_0$ is the diagonal of $\hat{T}$.

In some embodiments, and as explained above, the atomic norm used to determine the distances 150 of targets 130 corresponds to a collection of atoms, wherein each atom is time-shifted version of the transmitted waveform 140. In some embodiments, the atomic norm is obtained or determined by performing a frequency-domain atomic norm optimization procedure or performing a projected gradient descent, as described above.

In some embodiments, the correlation procedure at block 232 is a conventional correlation procedure, as is well known in the art. Any procedure that provides an indication (e.g., a measure) of similarity of the denoised signal 144 and the transmitted waveform 140 may be used in block 232.

In some embodiments, the ranging decision procedure at block 234 comprises the at least one processor 128 identifying at least one peak in the post-correlation signal 146 and computing an estimate of the distance between the sensor 122 and at least one target 130 based at least in part on the position of the at least one peak within the post-correlation signal 146. The ranging decision can also use a Fourier transform, as discussed above.

In some embodiments, the system 100 is capable of operating in at least two frequency bands. In some such embodiments, the at least one processor 128 performs the operations 220 separately on echo signals 142 received in different bands. The at least one processor 128 may be capable of performing the operations 220 on multiple echo signals 142 in parallel (e.g., at substantially the same time), or it may process multiple echo signals 142 sequentially. It is to be understood that when the receiver 120 receives echo signals 142 in multiple frequency bands, the at least one processor may process the echo signals 142 in any convenient manner. For example, the at least one processor 128 may perform some of the operations 220 in parallel and others sequentially.

Figure 12:
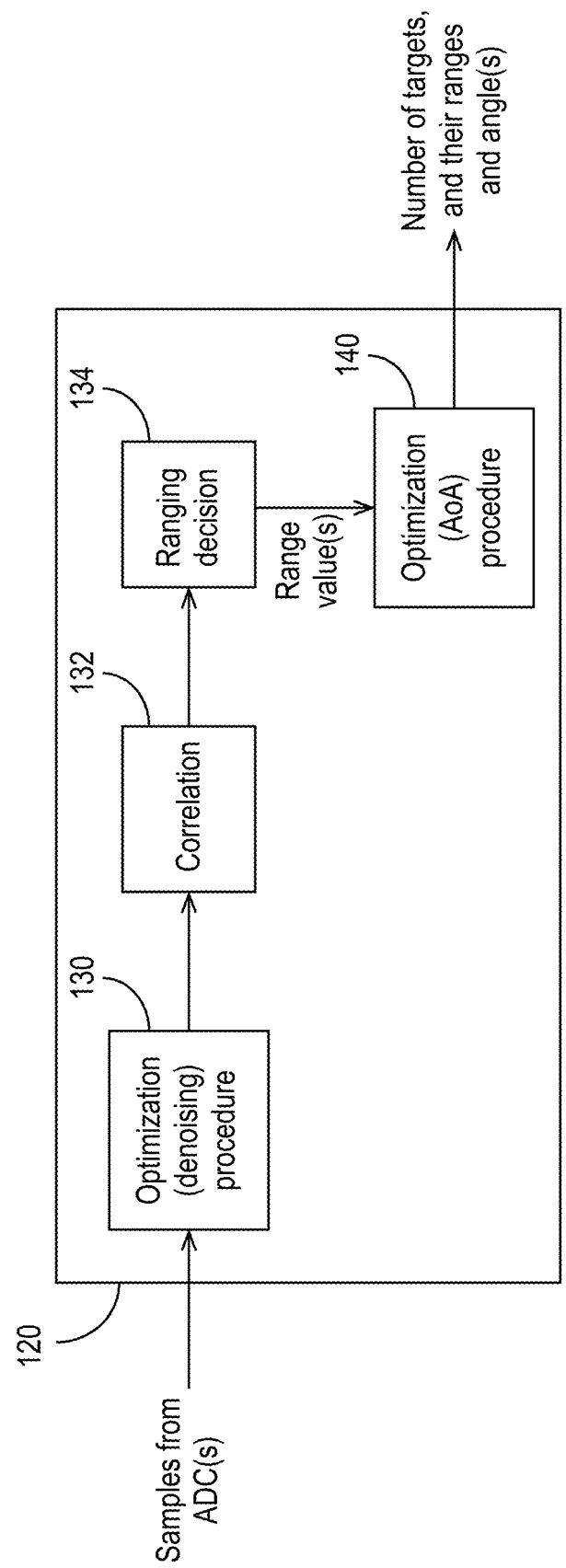
FIG. 12 is a block diagram illustrating an additional operation, referred to herein as the optimization procedure, for estimating angles of arrival in accordance with some embodiments.
Figure 13:
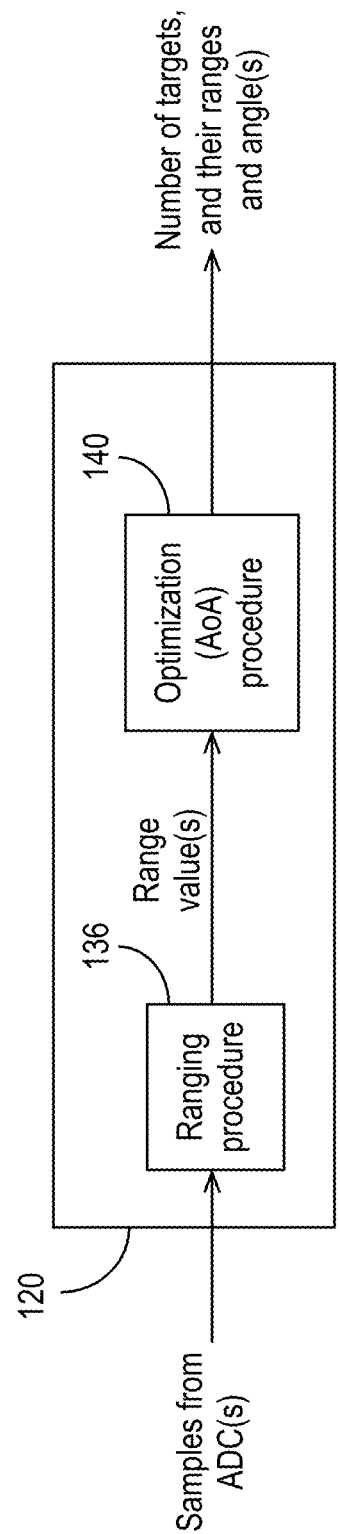
FIG. 13 is a block diagram illustrating the use of angle of arrival estimation in conjunction with conventional ranging techniques in accordance with some embodiments.

In addition to determining the distances 150 of the targets 130, the receiver may also identify the number of targets 130 and each target 130's angle of arrival. FIG. 12 is a block diagram illustrating an additional operation 220, referred to herein as the optimization procedure 240. As discussed below, the optimization procedure 240 can also take advantage of atomic norm techniques. In such embodiments, as discussed further below, the atoms can be different than in the range estimation described above. However, as we have seen above, they are substantially similar when the ranging problem is posed in the frequency domain. The angle-of-arrival techniques may be used in conjunction with the ranging techniques (as shown in FIG. 12), or they may be used in conjunction with conventional ranging techniques 236, as shown in FIG. 13.

Angle of Arrival Determination

Next, we describe the model and the assumptions that can be used to develop a suitable optimization using the atomic norm to estimate the angles of arrival of the targets 130.

1. We consider a uniform linear array (ULA) of receiver sensors 122 with N sensors 122, where the spacing between adjacent sensors is d. (We will often, though not always, assume that $$d = \frac{\lambda}{2},$$

where $\lambda$ is the wavelength of the carrier frequency in use. As explained previously, the techniques described herein do not require or rely on any particular spacing between the sensors 122.)

2. We assume there are K "far-field" targets, meaning that the targets 130 are located at distances 150 at which the electromagnetic fields are dominated by electric or magnetic fields with electric dipole characteristics, and the non-radiative "near-field" behaviors of the electromagnetic fields are negligible.

3. We assume the targets 130 are stationary (they are not moving).

4. We assume that there is no multi-path. The only path from the sensor array 121 to each target 130 and back is the line-of-sight (LOS) path.

5. The k-th target 150 (k=1, 2, . . . , K) is at an angle $$\theta_k \in \left(-\frac{\pi}{2}, \frac{\pi}{2}\right),$$

relative to the line perpendicular to the array 121.

Figure 14:
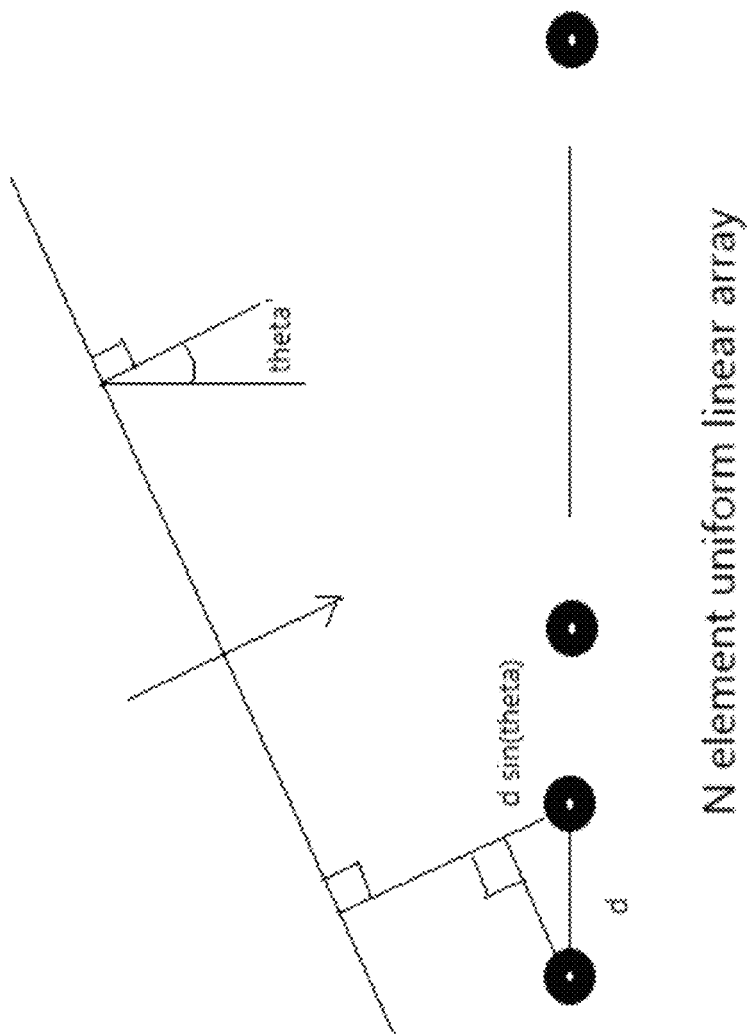
FIG. 14 illustrates how signals reflecting off of a target arrive at a receiver in accordance with some embodiments.

With these assumptions, any signal reflecting off a target 150 at angle $\theta$ will arrive as a planar wavefront with angle $\theta$ perpendicular to the array, as shown in FIG. 14. As shown in FIG. 14, the wavefront traverses an extra distance of d sin $\theta$ to reach the next antenna element (e.g., sensor 122). Assuming the medium is air, this distance corresponds to a time of $$t = \frac{d \sin\theta}{c}$$

and, therefore, if the transmitted signal has a wavelength of $\lambda$, the distance difference corresponds to a phase difference of $$\phi_\theta = 2\pi \frac{d}{\lambda} \sin\theta.$$

Thus, associated with an angle of arrival (AoA) of $\theta$, we can associate a so-called steering vector across the N-element ULA as $$v_\theta = \begin{bmatrix} 1 \\ e^{j\phi_\theta} \\ e^{j2\phi_\theta} \\ \vdots \\ e^{j(N-1)\phi_\theta} \end{bmatrix}, \phi_\theta = 2\pi \frac{d}{\lambda} \sin\theta.$$

The above vector is called a steering vector because if one transmits a beam from the ULA with the above phases, then the maximum energy is returned if the target 130 lies at angle $\theta$.

More generally, if the target 130 is at angle $\theta'$ and we probe with a beam directed at angle $\theta$, then the received energy will be proportional to $$|v_\theta^* v_{\theta'}|^2 = \left|\sum_{n=1}^{N-1} e^{j(\phi_\theta - \phi_{\theta'})}\right|^2 = \left|\frac{1 - e^{j(\phi_\theta - \phi_{\theta'})N}}{1 - e^{j(\phi_\theta - \phi_{\theta'})}}\right|^2 = \left|\frac{\sin\left(N\pi \frac{d}{\lambda}(\sin\theta - \sin\theta')\right)}{\sin\left(\pi \frac{d}{\lambda}(\sin\theta - \sin\theta')\right)}\right|^2.$$

Figure 15:
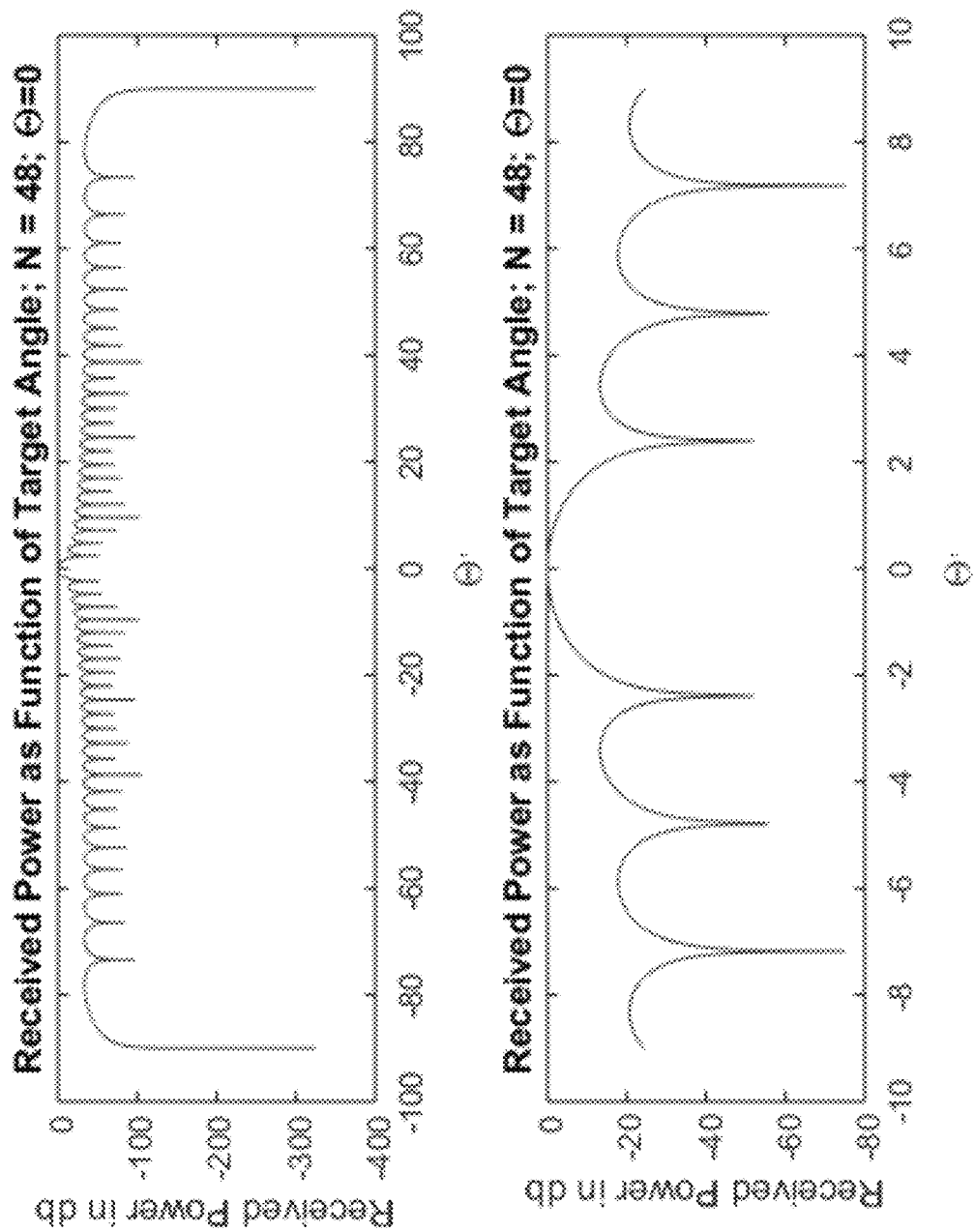
FIGS. 15 and 16 plot the received power of a uniform linear array for two target angles in accordance with some embodiments.
Figure 16:
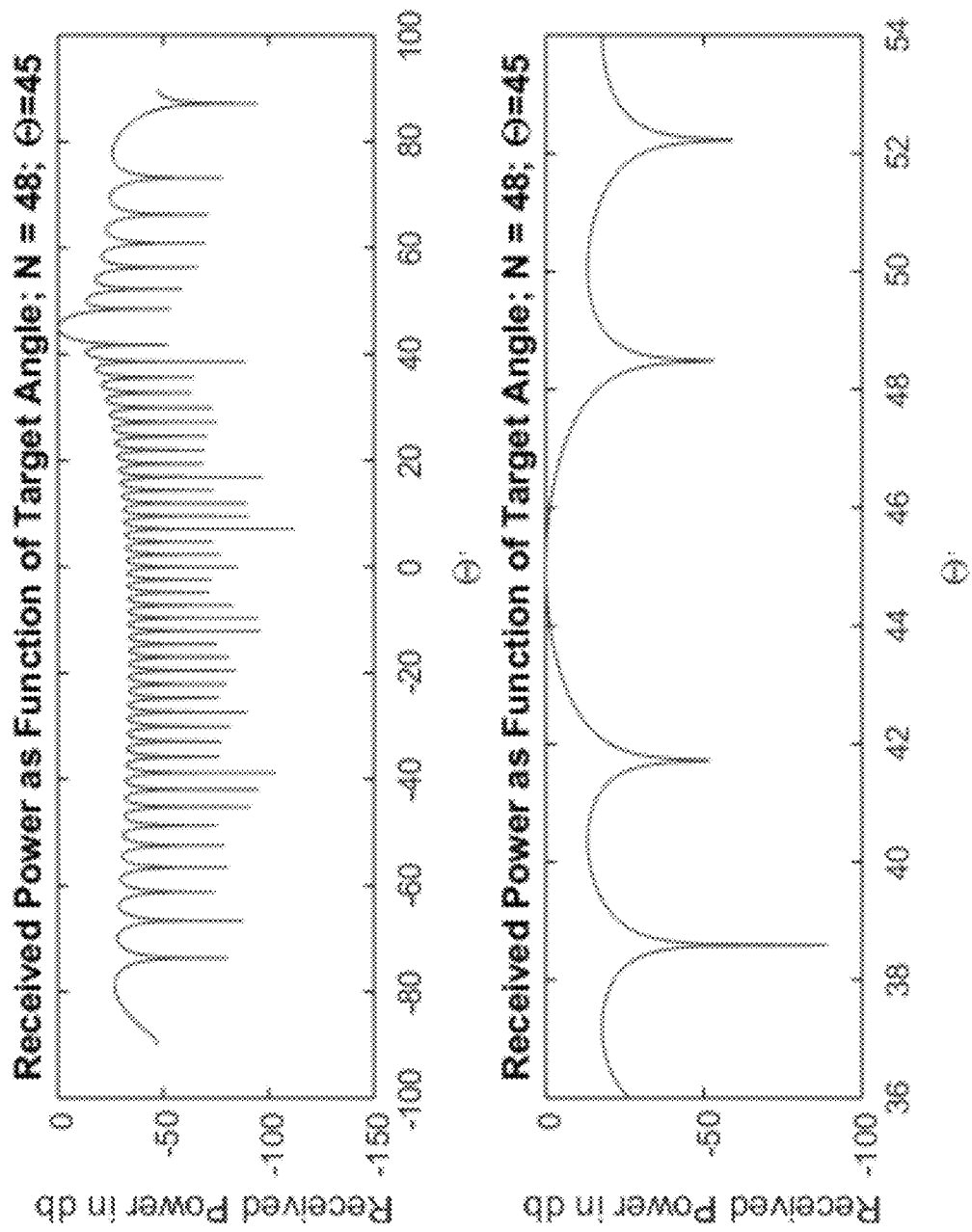
Figure 17A:
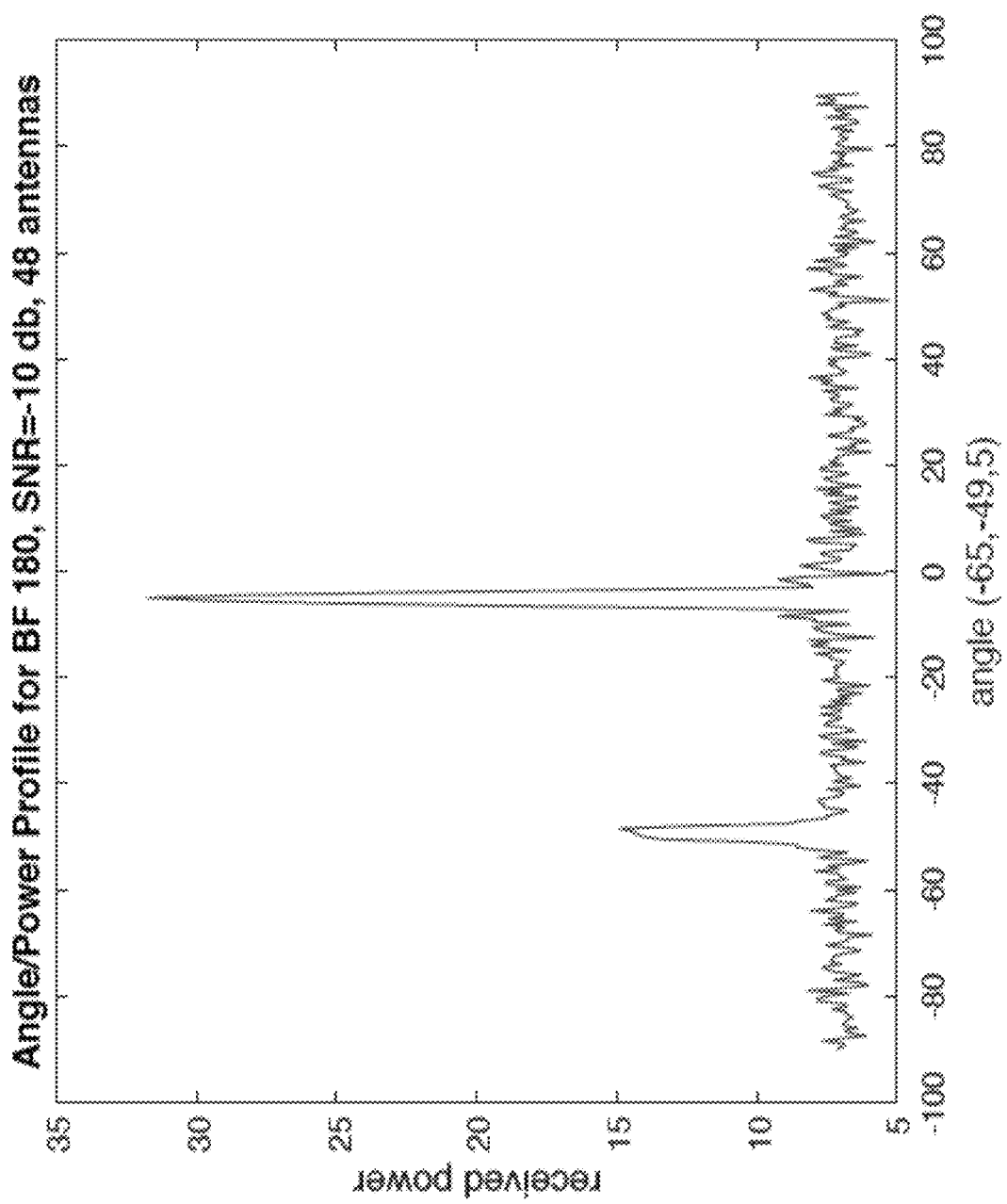
FIGS. 17A through 17E illustrate received power as a function of angle for various scenarios in accordance with some embodiments.
Figure 17B:
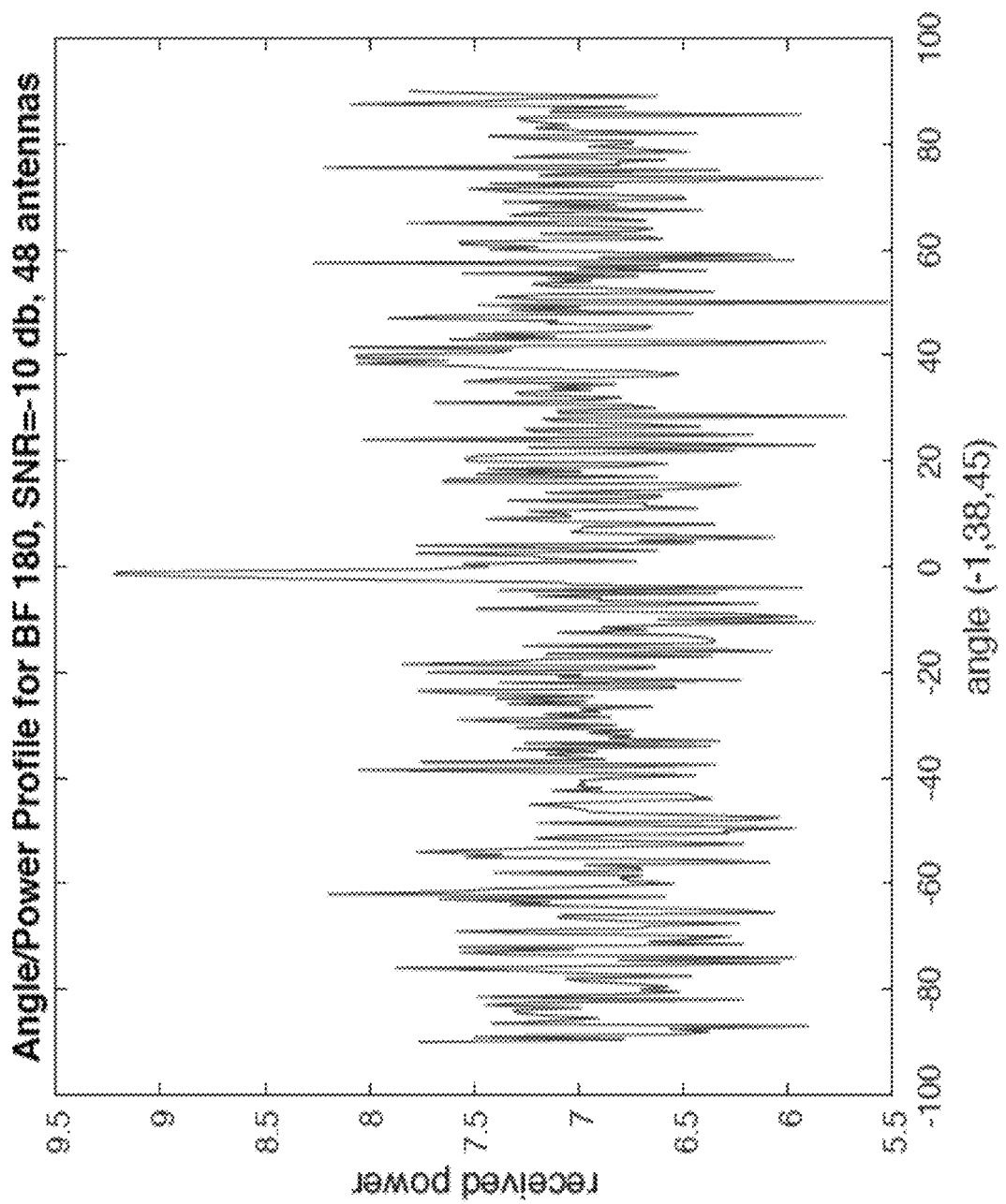
Figure 17C:
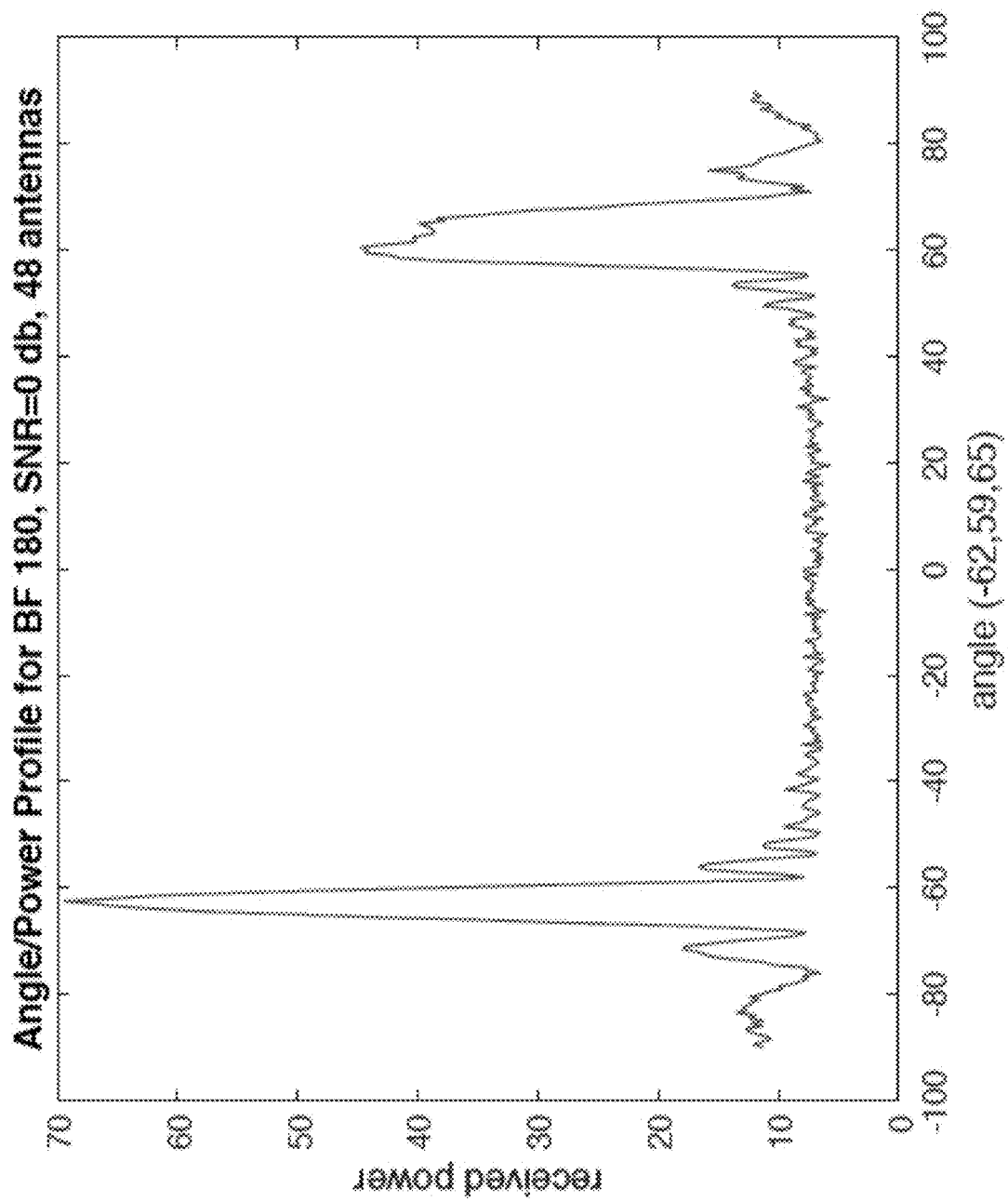
Figure 17D:
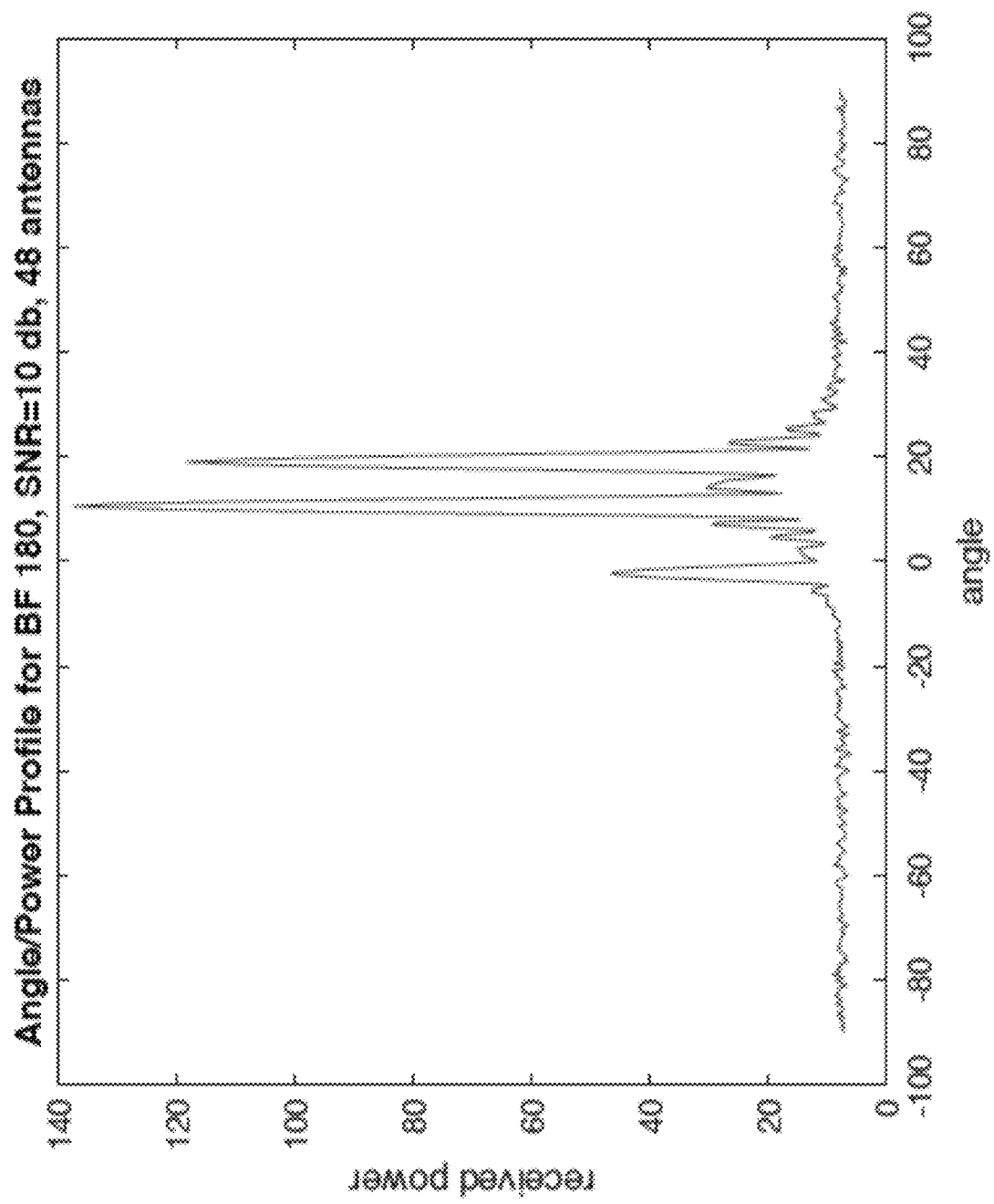
Figure 17E:
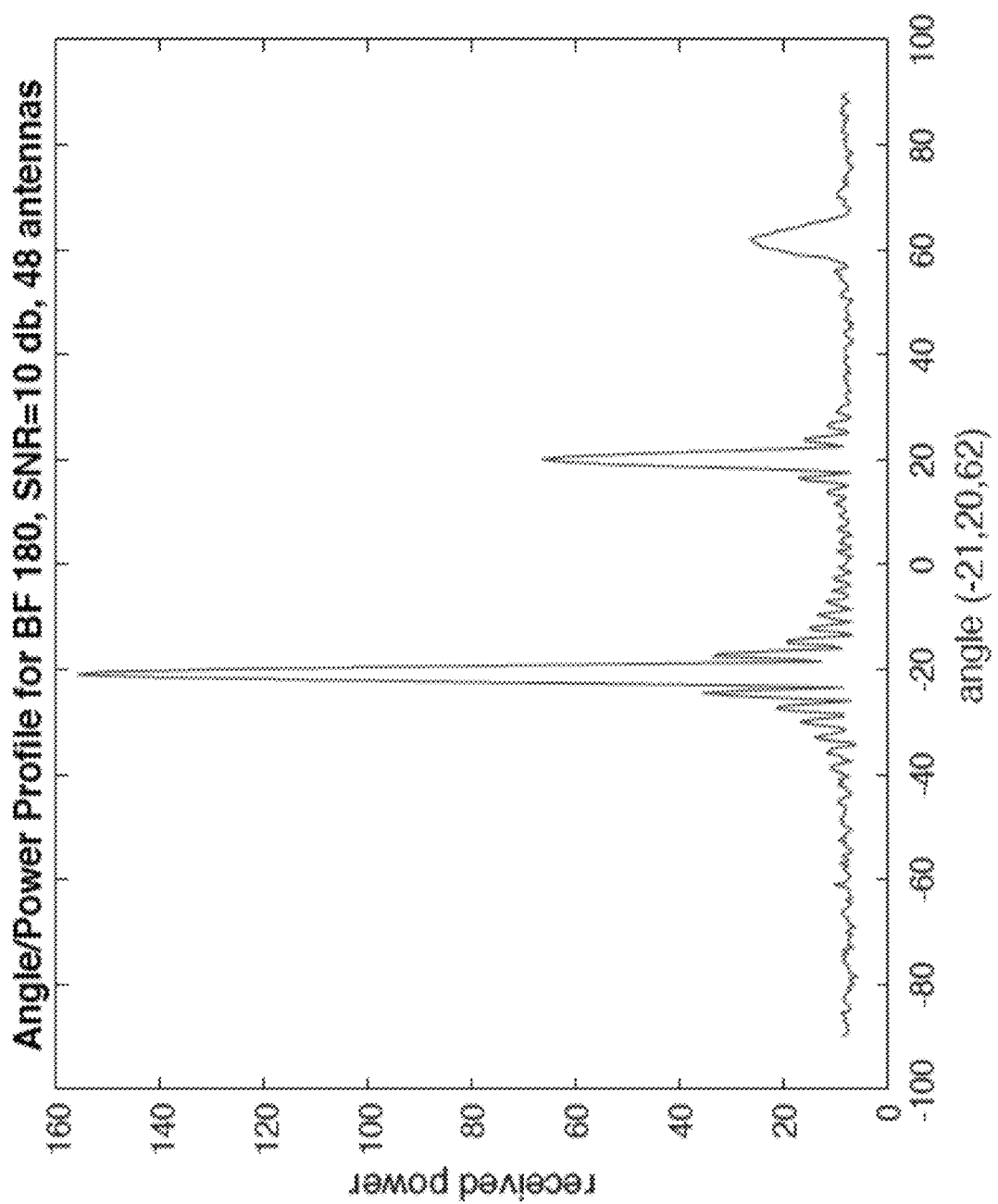

FIGS. 15 and 16 plot the received power of an N=48-element ULA with half wavelength spacing, $$d = \frac{\lambda}{2},$$

as a function of the target 130 angle $\theta'$ for two transmitted beams, one at $\theta=0°$ (FIG. 15) and one at $\theta=45°$ (FIG. 16).

We want to determine the $\theta_k$, the so-called "angles-of-arrival" (AoA) of the targets. We will now contrast two schemes for recovering the angles of arrival for the K targets at $\theta_1, \ldots, \theta_K$. The first is conventional beamforming. The second is what is referred to herein as random beamforming with atomic norm recovery in accordance with some embodiments.

Conventional Beamforming

Assuming we have K targets at angles of arrival $\theta_1, \ldots, \theta_K$, then if we transmit a beam at angle $\theta$, the received energy from each target will be proportional to $$|\alpha_k v_{\theta_k}^* v_k|^2$$

where $\alpha_k$ is a complex number whose magnitude and phase depends on the distance of target k and its reflection coefficient. Estimating $\alpha_k$ is also possible, but here we focus on estimating $\theta_k$. Because the signal from the target k arrives with steering vector $v_{\theta_k}$, in aggregate the received signal at the antenna array will be the N-dimensional vector $$y(\theta) = \sqrt{\frac{E_{beam}}{N}} \sum_{k=1}^{K} \alpha_k v_{\theta_k} v_{\theta_k}^* v_\theta + z,$$

where $E_{beam}$ is the total energy of the beam (the transmit energy per antenna is $E_{beam}/N$), z is additive noise with iid (independent and identically distributed, meaning that each random variable has the same probability distribution as the others, and all are mutually independent) complex Gaussian zero-mean $\sigma^2$-variance elements, and we have written $y(\theta)$ to explicitly show that it is the received signal when the transmitter (which may be an array) is transmitting a beam centered at angle $\theta$. The SNR can be computed to be $$SNR(\theta) = \frac{E_{beam} \sum_{k=1}^{K} |\alpha_k|^2 \cdot |v_{\theta_k}^* v_\theta|^2}{N\sigma^2}.$$

In the beamforming method, the antenna array transmits L beams, centered at equidistant angles (denoted by subscripts to distinguish the transmitted beam angles from the target angles, which we denote by subscripts), given by $$\theta^l = -\frac{\pi}{2} + \frac{\pi}{L}, \quad l = 1, \ldots, L.$$

The targets are determined by searching for peaks in the received energies among the transmit beams, i.e., among $$\|y(\theta^l)\|^2, l=1, \ldots, L.$$

If we use L beams to probe the targets, the total energy is $$E_{tot} = L E_{beam}.$$

FIGS. 17A through 17E show a few scenarios for an array with N=48 elements, K=3 targets, and various values of SNR. As can be seen from FIGS. 17A through 17E, looking for peaks in the received power can result in sometimes missing the targets (especially at low SNR).

Random Beams and the Atomic Norm

In some embodiments, instead of transmitting beams centered at certain angles $\theta^l$, the transmitter (which may be an array) transmits M random beams:

$$a_m = \begin{bmatrix} a_{1m} \\ a_{2m} \\ \vdots \\ a_{Nm} \end{bmatrix}, \quad m = 1, \ldots, M,$$

where the $\alpha_{mn}$, are chosen iid random from a complex Gaussian distribution with zero mean and unit variance. This means that each $\alpha_{mn}$, is a complex random variable whose phase is distributed uniformly and whose amplitude has a Rayleigh distribution.

In this case, the received signal from the m-th beam is given by:

$$y_m = \sqrt{\frac{E_{beam}}{N}} \sum_{k=1}^{K} \alpha_k v_{\theta_k} v_{\theta_k}^* a_m + z$$

Note that $$v_{\theta_k} v_{\theta_k}^* = \begin{bmatrix} 1 \\ e^{j\phi_{\theta_k}} \\ \vdots \\ e^{j\phi_{\theta_k}(N-1)} \end{bmatrix} \begin{bmatrix} 1 & e^{-j\phi_{\theta_k}} & \ldots & e^{-j\phi_{\theta_k}(N-1)} \end{bmatrix} =$$

$$\begin{bmatrix} 1 & e^{-j\phi_{\theta_k}} & \ldots & e^{-j\phi_{\theta_k}(N-1)} \\ e^{j\phi_{\theta_k}} & 1 & \ddots & e^{-j\phi_{\theta_k}(N-2)} \\ \vdots & \ddots & \ddots & \vdots \\ e^{j\phi_{\theta_k}(N-1)} & e^{j\phi_{\theta_k}(N-2)} & \ldots & 1 \end{bmatrix} = T_{\theta_k}$$

where the matrix $T_{\theta_k}$ is Toeplitz. It is now possible to see that $$T_{\theta_k} a_m = \begin{bmatrix} 0 & \ldots & \ldots & a_{1m} & \ldots & \ldots & a_{Nm} \\ 0 & \ldots & a_{1m} & \ldots & \ldots & a_{Nm} & 0 \\ \vdots & \ddots & \ddots & \ddots & \ddots & \ddots & \vdots \\ a_{1m} & \ldots & \ldots & \ldots & a_{Nm} & \ldots & 0 \end{bmatrix} \begin{bmatrix} e^{j\phi_{\theta_k}(N-1)} \\ \vdots \\ 1 \\ \vdots \\ e^{-j\phi_{\theta_k}(N-1)} \end{bmatrix} =$$

$$H_{a_m} \begin{bmatrix} e^{j\phi_{\theta_k}(N-1)} \\ \vdots \\ 1 \\ \vdots \\ e^{-j\phi_{\theta_k}(N-1)} \end{bmatrix}$$

Note that $H_{a_m}$ is a Hankel matrix. Putting everything together, the N-dimensional received vector $y_m$ can be written as $$y_m = \sqrt{\frac{E_{beam}}{N}} H_{a_m} \sum_{k=1}^{K} \alpha_k \omega_{\theta_k} + z,$$

where $$\omega_{\theta_k} = \begin{bmatrix} e^{j\phi_{\theta_k}(N-1)} \\ \vdots \\ 1 \\ \vdots \\ e^{-j\phi_{\theta_k}(N-1)} \end{bmatrix}$$

If we now put all the measurements $y_i, \ldots, y_m$ together to form the MN-dimensional measurement vector $$y = \begin{bmatrix} y_1 \\ \vdots \\ y_M \end{bmatrix},$$

the Hankel matrices $H_{a_1}, \ldots, H_{a_M}$ together to form the MN×(2N−1) dimensional matrix $$H = \begin{bmatrix} H_{a_1} \\ \vdots \\ H_{a_M} \end{bmatrix},$$

and denote the unknown vector by $$x = \sum_{k=1}^{K} \alpha_k \omega_{\theta_k} = \sum_{k=1}^{K} \alpha_k \begin{bmatrix} e^{j\phi_{\theta_k}(N-1)} \\ \vdots \\ 1 \\ \vdots \\ e^{-j\phi_{\theta_k}(N-1)} \end{bmatrix},$$

we may write $$y = \sqrt{\frac{E_{beam}}{N}} Hx + z.$$

The above expression has MN equations, and the unknown vector has 2N−1 dimensions. Thus, it is possible to find x using the pseudo-inverse of H (or to find x through a linear minimum mean-squared error (MMSE) framework) and then attempt to estimate the $\theta_1, \ldots, \theta_K$. Although doing so is possible, the performance can be significantly improved because the pseudo-inverse or linear MMSE ignores the structure of x (the fact that x is the sum of K unknown sinusoids). The methods and systems disclosed herein strive instead to estimate the signal while taking into account its special structure.

The above discussions pertained to the use of a uniform linear array (ULA) of collocated transmit and receive antennas. More generally, it is possible to consider a sparse transmit array and sparse receive array of antennas. To this end, assume that we have $N_t$ transmit antennas placed in positions $$d_{t,p} = d \cdot l_{t,p}, p = 1, 2, \ldots, N_t$$

where d is a given distance and the $l_{t,p}$ are a collection of integers. In other words, the transmitters are placed at integer multiples of a fixed distance d, for some collection of integers. Likewise, assume that we have $N_r$ receive antennas placed in positions $$d_{r,q} = d \cdot l_{r,q}, q = 1, 2, \ldots, N_r,$$

where the $l_{r,p}$ are a collection of integers. In other words, the transmitters are placed at integer multiples of a fixed distance d, for some collection of integers.

For this transmit array, the transmit steering vector for a direction θ is given by $$v_{t,\theta} = \begin{bmatrix} e^{jl_{t,1}\phi_\theta} \\ e^{jl_{t,2}\phi_\theta} \\ e^{jl_{t,3}\phi_\theta} \\ \vdots \\ e^{jl_{t,N_t}\phi_\theta} \end{bmatrix}, \phi_\theta = 2\pi\frac{d}{\lambda}\sin\theta.$$

Likewise, for this receive array, the receive steering vector for a direction θ is given by $$v_{r,\theta} = \begin{bmatrix} e^{jl_{r,1}\phi_\theta} \\ e^{jl_{r,2}\phi_\theta} \\ e^{jl_{r,3}\phi_\theta} \\ \vdots \\ e^{jl_{r,N_r}\phi_\theta} \end{bmatrix}, \phi_\theta = 2\pi\frac{d}{\lambda}\sin\theta.$$

As before, assume that we transmit a collection of M beams $$a_m = \begin{bmatrix} a_{1m} \\ a_{2m} \\ \vdots \\ a_{Nm} \end{bmatrix}, m = 1, \ldots, M.$$

Assuming that we have K targets at angles $\theta_1, \ldots, \theta_K$ then the $N_r$-dimensional signal received at the receive array for transmission of the m-th beam will be $$y_m = \sqrt{\frac{E_{beam}}{N}} \sum_{k=1}^{K} \alpha_k v_{r,\theta_k} v^*_{t,\theta_k} a_m + z$$

Note that we now have $$v_{\theta_k} v^*_{\theta_k} = \begin{bmatrix} e^{jl_{r,1}\phi_{\theta_k}} \\ e^{jl_{r,2}\phi_{\theta_k}} \\ \vdots \\ e^{jl_{r,N_r}\phi_{\theta_k}} \end{bmatrix} \begin{bmatrix} e^{-jl_{t,1}\phi_{\theta_k}} & e^{-jl_{t,2}\phi_{\theta_k}} & \cdots & e^{-jl_{t,N_t}\phi_{\theta_k}} \end{bmatrix} =$$

$$\begin{bmatrix} e^{j(l_{r,1}-l_{t,1})\phi_{\theta_k}} & e^{j(l_{r,1}-l_{t,2})\phi_{\theta_k}} & \cdots & e^{j(l_{r,1}-l_{t,N_t})\phi_{\theta_k}} \\ e^{j(l_{r,2}-l_{t,1})\phi_{\theta_k}} & e^{j(l_{r,2}-l_{t,2})\phi_{\theta_k}} & \ddots & e^{j(l_{r,2}-l_{t,N_t})\phi_{\theta_k}} \\ \vdots & \ddots & \ddots & \vdots \\ e^{j(l_{r,N_r}-l_{t,1})\phi_{\theta_k}} & e^{j(l_{r,N_r}-l_{t,2})\phi_{\theta_k}} & \cdots & e^{j(l_{r,N_r}-l_{t,N_t})\phi_{\theta_k}} \end{bmatrix} = T_{\theta_k}$$

Let us now define $l_{r,min} = \min l_{r,p}$, $l_{r,max} = \max l_{r,p}$, $l_{t,min} = \min l_{t,p}$, and $l_{t,max} = \max l_{t,p}$. Further defining $$\omega_{\theta_k} = \begin{bmatrix} e^{j(l_{r,min}-l_{t,max})\phi_{\theta_k}} \\ e^{j(l_{r,min}-l_{t,max}+1)\phi_{\theta_k}} \\ \vdots \\ e^{j(l_{r,max}-l_{t,min}-1)\phi_{\theta_k}} \\ e^{j(l_{r,max}-l_{t,min})\phi_{\theta_k}} \end{bmatrix}$$

one can write $$v_{r,\theta_k} v_{t,\theta_k}^* \alpha_m = T_{\theta_k} \alpha_m = H_{a_m} \omega_{\theta_k}$$

where the (p, q) entry of the matrix $H_{a_m}$ is given by $$(H_{a_m})_{p,q} = \alpha_{q-l_{r,p},m}$$

if there exists a transmitter at distance q from receiver p, and $$(H_{a_m})_{p,q} = 0$$

otherwise.

Finally, defining $$H = \begin{bmatrix} H_{a_1} \\ \vdots \\ H_{a_M} \end{bmatrix}$$

and $$x = \sum_{k=1}^{K} \alpha_k \omega_{\theta_k},$$

we may write $$y = \sqrt{\frac{E_{beam}}{N}} Hx + z,$$

which is formally identical to the equation we had for the ULA case, except that the definition of the matrix H and vector x are different. Close examination of this equation shows that we have $MN_r$ equations and $N_r N_t$ unknowns.

Next, we present the development of the atomic norm framework for use in accordance with some embodiments for estimating angles of arrival of the targets 130.

The Atomic Norm Framework for Angle-of-Arrival Estimation

In the atomic norm framework used in accordance with some embodiments, we assume, once again, that we have a set of atoms $$\mathcal{A} = \{\eta_i\},$$

where the set may be finite, countably infinite, or even uncountably infinite. As before, we call a signal x structured if it can be written as the sum of a few atoms, say K of them, where K is less than the dimension of the ambient space of x, i.e., $$x = \sum_{k=1}^{K} \alpha_k \eta_k.$$

For determining the angles of arrival of the targets 130, the set of atoms is the set of all possible sinusoids $$\mathcal{A} = \left\{ \begin{bmatrix} e^{j\phi_{\theta_k}(N-1)} \\ \vdots \\ 1 \\ \vdots \\ e^{-j\phi_{\theta_k}(N-1)} \end{bmatrix}, -\frac{\pi}{2} \le \phi \le \frac{\pi}{2} \right\},$$

and our unknown 2N−1 dimensional signal is the sum of K of them:

$$x = \sum_{k=1}^{K} \alpha_k \begin{bmatrix} e^{j\phi_{\theta_k}(N-1)} \\ \vdots \\ 1 \\ \vdots \\ e^{-j\phi_{\theta_k}(N-1)} \end{bmatrix}.$$

Herein, the atomic norm of a vector x, with respect to a set of atoms $\mathcal{A} = \{\eta_i\}$ is defined as $$\|x\|_{\mathcal{A}} = \begin{matrix} \min & \|c\|_1 \\ \text{subject to} & x = \sum_k c_k \eta_k \end{matrix}$$

In other words, the atomic norm of x is the most economical way that x can be expressed in terms of a linear combination of atoms, where by economical we mean the representation that minimizes the $\|\cdot\|$ norm, where $\|c\| = \Sigma_k |c_k|$. A small atomic norm means that x can be represented as the sum of a few atoms. Conversely, a large atomic norm means that many atoms are needed to represent x.

For angle-of-arrival estimation, the atomic norm to compute is:

$$\|x\|_{\mathcal{A}} = \begin{cases} \min & \|c\|_1 \\ \text{subject to} & x = \sum_k c_k \begin{bmatrix} e^{j\phi_{\theta_k}(N-1)} \\ \vdots \\ 1 \\ \vdots \\ e^{-j\phi_{\theta_k}(N-1)} \end{bmatrix} \end{cases}$$

Computing the above atomic norm in this form may be difficult. Using duality, however, one can show that the atomic norm can be alternatively computed as $$\|x\|_{\mathcal{A}} = \begin{cases} \max & \operatorname{Re} \lambda^* x \\ \text{subject to} & |\lambda^* \omega_\phi| \le 1, \forall\ -\frac{\pi}{2} \le \phi \le \frac{\pi}{2} \end{cases}$$

In this formulation, there are uncountably infinite constraints:

$$\left| \sum_{n=-(N-1)}^{N-1} \lambda_i^* e^{-j\phi n} \right| \le 1, -\frac{\pi}{2} \le \phi \le \frac{\pi}{2}$$

Using the Kalman-Yakubovich-Popov (KYP) lemma, however, one can replace the above infinitely-many inequalities with the finite linear matrix inequality (LMI):

$$\begin{bmatrix} 1 & \lambda^* \\ \lambda & e_1 e_1^T + M \end{bmatrix} \geq 0$$

and the sums of the diagonals of M are zero where $e_1$ is the first unit vector in the standard basis. Thus, the atomic norm can be written as $$\|x\|_{\mathcal{A}} = \mathrm{Re}\lambda^* x \begin{cases} \max \\ \text{subject to} \begin{bmatrix} 1 & \lambda^* \\ \lambda & e_1 e_1^T + M \end{bmatrix} \geq 0 \end{cases}$$

and the sums of the diagonals of M are zero

The above formulation allows us to efficiently compute the atomic norm from a finite-dimensional semidefinite program (SDP). SDPs can be solved efficiently and are convex optimization problems.

The above formulation may be inconvenient, however, because it is in terms of a maximization problem. Having an expression in terms of a minimization problem may be more desirable. This can be done by appealing to duality once again. We define a $(2N-1) \times (2N-1)$ Hermitian Toeplitz matrix:

$$T = \begin{bmatrix} t_0 & t_1 & \cdots & t_{2N-2} \\ t_1^* & t_0 & \ddots & \vdots \\ \vdots & \ddots & \ddots & \vdots \\ t_{2N-2}^* & \cdots & \cdots & t_0 \end{bmatrix}$$

Then we can write $$\|x\|_{\mathcal{A}} = \begin{cases} \max & \omega + t_0 \\ \text{subject to} \begin{bmatrix} \omega & -\frac{1}{2}x^* \\ -\frac{1}{2}x & T \end{bmatrix} \geq 0 \end{cases}$$

The above equation is the form of the atomic norm that is used in accordance with some embodiments.

Estimating x Using the Atomic Norm

Recall that we want to solve the system of linear equations $$y = \sqrt{\frac{E_{beam}}{N}} Hx + z,$$

where the signal x has the structure of being the sum of a few sinusoids. We thus want to find a solution $\hat{x}$ that simultaneously makes the error $$y - \sqrt{\frac{E_{beam}}{N}} H\hat{x}$$

small and that forces $\hat{x}$ to be structured.

The atomic norm framework proposes the following algorithm (which is sometimes referred to as generalized LASSO):

$$\hat{x} = \arg\min \left\| y - \frac{E_{beam}}{N} Hx \right\|_2 + \lambda \|x\|_{\mathcal{A}},$$

where here $\lambda > 0$ is a regularization parameter (and not the wavelength) that balances the estimation error versus how structured the signal is.

Because our final expression for the atomic norm is a minimization, we can write the above as a single minimization and obtain $$\hat{x} = \begin{cases} \arg\min \left\| y - \sqrt{\frac{E_{beam}}{N}} Hx \right\|_2 + \lambda(\omega + t_0) \\ \text{subject to} \begin{bmatrix} \omega & -\frac{1}{2}x^* \\ -\frac{1}{2}x & T \end{bmatrix} \geq 0 \end{cases}$$

This formulation is suitable to estimate x in accordance with some embodiments.

Recovering the Angles of Arrival

In some embodiments, after finding the structured signal x (as the sum of a few sinusoids), the angles $\phi_{\theta_1}, \ldots \phi_{\theta_k}$ are also found. There are a variety of suitable methods to find the angles $\phi_{\theta_1}, \ldots, \phi_{\theta_k}$ (such as, for example, Prony's method, or system identification methods such as Hankel norm approximation, balanced realization, etc.). For illustration purposes, we use a Hankel norm approximation method in the exemplary embodiment described below. It is to be understood that the use of the Hankel norm approximation is merely exemplary, and other methods may be used.

Summary of the Random Beamforming and Atomic Norm Method

In some embodiments in which the Hankel norm approximation is used, the angles of arrival may be found as follows:

1. Transmit M random beams, $\alpha_1, \ldots, \alpha_m$ (iid uniformly distributed phase, Rayleigh distributed magnitude) of energy $E_{beam}$ each.
2. For each beam, collect the N-dimensional received vector $y_m$ (m=1, ..., M) and form the Hankel matrix $H_{\alpha_m}$.
3. Stack all the measurements into the MN dimensional vector y and all the matrices $H_{\alpha_m}$ into the MN×(2N−1) dimensional matrix H. This matrix is referred to herein as an array signal.
4. Solve $$\hat{x} = \begin{cases} \arg\min \left\| y - \sqrt{\frac{E_{beam}}{N}} Hx \right\|_2 + \lambda(\omega + t_0) \\ \text{subject to} \begin{bmatrix} \omega & -\frac{1}{2}x^* \\ -\frac{1}{2}x & T \end{bmatrix} \geq 0 \end{cases}$$

5. Use the Hankel norm approximation algorithm to estimate the angles of arrival from $\hat{x}$.

Alternative Approach

Instead of the equation given in step 4 immediately above, we can equivalently solve $$\hat{x} = \begin{cases} \arg\min \left\| y - \sqrt{\frac{E_{beam}}{N}} Hx \right\|_2^2 + \lambda(\omega + t_0) \\ \text{subject to } \begin{bmatrix} \omega & -\frac{1}{2}x^* \\ -\frac{1}{2}x & T \end{bmatrix} \geq 0 \end{cases}$$

Note that the only difference relative to the expression in step 4 above is that we have used $\|\cdot\|_2^2$ instead of $\|\cdot\|_2$. With this change, it may be desirable to use a different value of $\lambda$ for the solution of the two optimization problems to coincide.

Now the linear matrix inequality constraint is equivalent to $$T \geq 0, \quad x \in \text{Range}(T), \quad \omega - \frac{1}{4}x^* T^\dagger x \geq 0,$$

where $T^\dagger$ is the pseudo-inverse of T. This implies that we can rewrite the expression above for $\hat{x}$ as $$\hat{x} = \begin{cases} \arg\min \left\| y - \sqrt{\frac{E_{beam}}{N}} Hx \right\|_2^2 + \frac{\lambda}{4} x^* T^\dagger x + \lambda t_0 \\ \text{subject to } T \geq 0, \ x \in \text{Range}(T) \end{cases}$$

The optimization over x is a simple quadratic optimization that can be done in closed form to yield $$\hat{x} = \left(\frac{\lambda}{4}\hat{T}^\dagger + \frac{E_{beam}}{N}H^*H\right)^{-1} \sqrt{\frac{E_{beam}}{N}} H^* y$$

$$= \frac{\lambda}{4}\hat{T}\left(I + \frac{4E_{beam}}{\lambda N}H^*H\hat{T}\right)^{-1} \sqrt{\frac{E_{beam}}{N}} H^* y,$$

where $\hat{T}$ is given by $$\hat{T} = \arg\min_{T \geq 0}\left[\lambda t_0 + y^*\left(I + \frac{4E_{beam}}{\lambda N}HTH^*\right)^{-1} y\right].$$

Note that, $\hat{x}$ is in the range of $\hat{T}$, as desired.

Projected Gradient Descent

One can solve the equation for $\hat{T}$ above using simple projected gradient descent. Because the matrix T is Toeplitz, we need only obtain the values $t_0, t_1, \ldots, t_{2N-2}$, which are the values of the first row of T. Define the vector $$t = \begin{bmatrix} t_0 \\ t_1 \\ \vdots \\ t_{2N-2} \end{bmatrix},$$

and the cost function as $$f(t) = \lambda t_0 + y^*\left(I + \frac{4E_{beam}}{\lambda N}HTH^*\right)^{-1} y.$$

Then the projected gradient descent method is simply $$t^{(i+1)} = \text{Proj}_{T \geq 0}(t^{(i)} - \eta \nabla f(t^{(i)})),$$

where $\text{Proj}_{T \geq 0}(\bullet)$ projects onto the space of positive semi-definite Toeplitz matrices and $\eta > 0$ is the learning rate or step size.

If we further define the vector $$z = \left(I + \frac{4E_{beam}}{\lambda N}H^*H\hat{T}\right)^{-1} \sqrt{\frac{E_{beam}}{N}} H^* y,$$

and the $(2N-1)\times(2N-1)$-dimensional lower triangular shift matrix $$Z = \begin{bmatrix} 0 & & & \\ 1 & 0 & & \\ & \ddots & \ddots & \\ & & 1 & 0 \end{bmatrix},$$

then the components of the gradient of $f(\bullet)$ can be computed as $$\frac{\partial f(t)}{\partial t_0} = \lambda - \frac{4E_{beam}}{\lambda N}\|z\|^2$$

and $$\frac{\partial f(t)}{\partial t_k} = -\frac{4E_{beam}}{\lambda N}\left(z^*(Z^k + Z^{*k})z\right), \quad k = 1, \ldots, 2N-1.$$

Furthermore, $\text{Proj}_{T \geq 0}(\bullet)$ can be readily computed by alternatingly projecting onto the (convex) spaces of positive semidefinite matrices and Toeplitz matrices, respectively.

Summary of Projected Gradient Descent Method to Estimate Angles of Arrival

In accordance with some embodiments, the projected gradient descent method may be implemented as follows:
1. Transmit M random beams, $\alpha_1, \ldots, \alpha_m$ (iid uniformly distributed phase, Rayleigh distributed magnitude) of energy $E_{beam}$ each.
2. For each beam, collect the N-dimensional received vector $y_m$ (m=1, ..., M) and form the Hankel matrix $H_{\alpha_m}$.
3. Stack all the measurements into the MN-dimensional vector y and all the matrices $H_{\alpha_m}$ into the MN×(2N-1)-dimensional matrix H.
4. Iterate to convergence $$t^{(i+1)} = \text{Proj}_{T \geq 0}(t^{(i)} - \eta \nabla f(t^{(i)})),$$

where $\text{Proj}_{T \geq 0}(\bullet)$ projects onto the space of positive semi-definite Toeplitz matrices and $\eta > 0$ is the learning rate or step size, and $$\frac{\partial f(t)}{\partial t_k} = \lambda \delta_k - \frac{4E_{beam}}{\lambda N}\left(z^*(Z^k + Z^{*k})z\right), \quad k = 0, \ldots, 2N-1$$

(where $\delta_k$ is the Kroneker delta), and with $$z = \left(I + \frac{4E_{beam}}{\lambda N}H^*H\hat{T}\right)^{-1} \sqrt{\frac{E_{beam}}{N}} H^* y \text{ and } Z = \begin{bmatrix} 0 & & & \\ 1 & 0 & & \\ & \ddots & \ddots & \\ & & 1 & 0 \end{bmatrix}.$$

5. From the converged t construct $\hat{T}$ and hence $$\hat{x} = \frac{4}{\lambda}\hat{T}\left(I + \frac{4E_{beam}}{\lambda N}H^*H\hat{T}\right)^{-1}\sqrt{\frac{E_{beam}}{N}}H^*y.$$

6. Use the Hankel norm approximation algorithm (or another algorithm) to estimate the angles of arrival from $\hat{x}$.

Estimating Doppler Shift

When the targets are moving, the frequency of the carrier signal is altered according to the speed of the targets. This shift in frequency is referred to as the Doppler effect. The change in frequency, or Doppler shift, is given by $$f_D = \frac{2v}{\lambda}$$

where $v$ is the velocity of the target in the direction of the receive array, and $\lambda$ is the wavelength of the carrier. Determining the Doppler shift for any target allows one to determine its corresponding velocity in the direction of the receive array.

After downconversion, the baseband signal obtained at any receiver will be $$y(t) = \sum_{k=1}^{K}\alpha_k e^{j2\pi f_{D,k}t}s(t-t_k) + n(t),$$

where $t_k$ is the roundtrip time of the k-th target (which allows one to compute its range) and $f_{D,k}$ is the Doppler frequency of the k-th target (which allows one to compute its velocity in the direction of the receive array). This suggests that we should define our set of atoms as $$\mathcal{A} = \{e^{j2\pi f_D \cdot}s(\cdot - \tau)\},$$

where $\tau$ is an arbitrary time shift, and $f_D$ is an arbitrary frequency shift. Note that this is a set of uncountably many atoms parametrized by the two parameters $\tau$ and $f_D$.

Using this set of atoms one can construct a corresponding atomic norm and use it to estimate both the $t_k$ and the $f_{D,k}$.

Ranging and Angle-of-Arrival Estimation

Below, we summarize an exemplary procedure in accordance with some embodiments. Once the round-trip times (distances 150) have been estimated, a matched filter can be used to maximize the SNR and obtain the N-dimensional vector with elements measured on each antenna, for each beam m-1, . . . , M, given by $$x_m = \sum_{k=1}^{K}\alpha_k v_{\theta_k}v_{\theta_k}^* a_m + n,$$

where $\alpha_m$ is the m-th transmitted beam (an N-dimensional vector) and $$v_{\theta_k} = \begin{pmatrix} 1 \\ e^{j\varphi_{\theta_k}} \\ \vdots \\ e^{j\varphi_{\theta_k}(N-1)} \end{pmatrix}$$

is the steering vector from the kth target, where $$\varphi_{\theta_k} = 2\pi\frac{d}{\lambda}\sin(\theta_k).$$

In the equation immediately above, d is the antenna spacing, $\lambda$ is the wavelength, and $\theta_k$ is the angle of arrival of the k-th target. Note that the unknown signal is the sum of k sinusoids, each of frequency $$\varphi_{\theta_k} = 2\pi\frac{d}{\lambda}\sin(\theta_k).$$

By finding these frequencies, we can determine the number of targets K, as well as the corresponding angles of arrival.

By defining a Hankel matrix as described above, all the measurements can be compiled, and the atomic norm method can be used to determine the angles of arrival.

For example, some embodiments solve for the optimization problem $$\hat{T} = \underset{T \geq 0}{\operatorname{argmin}}\left[\lambda t_0 + y^*\left(I + \frac{4E_{beam}}{\lambda N}HTH^*\right)^{-1}y\right]$$

as described above, where the matrix H is diagonal for time-of-arrival (range/distance 150) estimation and block-Hankel for angle-of-arrival estimation. The parameter $\lambda > 0$ is a regularizer parameter that weighs the relative merits of conforming to the measured data and conforming to the structure of the signal. The above optimization problem is convex and has a unique global minimum. It can be solved, for example, by projected gradient descent (discussed further below), i.e., the gradient of the cost function is found and then the matrix T is updated along the direction of the negative gradient and finally projected onto the set of positive semidefinite Toeplitz matrices.

Once $\hat{T}$ has been found, the denoised signal is given by $$\hat{x} = \frac{4}{\lambda}\hat{T}\left(I + \frac{4E_{beam}}{\lambda N}H^*H\hat{T}\right)^{-1}\sqrt{\frac{E_{beam}}{N}}H^*y.$$

For time-of-arrival estimation, the correlation receiver can be applied to the denoised signal 144. For angle-of-arrival and Doppler shift estimation, one can construct a Hankel matrix out of the entries of $\hat{x}$ and use any system identification method, such as Hankel norm approximation, to find the angles of arrival and Doppler shift.

Notes on the Simulations

For completeness, we discuss below certain aspects of our simulations by which we generated FIGS. 15-17E.

In the beamforming method, the total transmit energy is $$E_{total,BF} = E_{beam,BF} \cdot L,$$

and in the atomic norm method $$E_{total,AN} = E_{beam,AN} \cdot M.$$

In the simulations, we used N=48 and K=3. For fair comparisons, and to avoid the issue of estimating K (which should be done later), both methods were assumed to know the value of K. In the beamforming case, the algorithm searched for the top 3 peaks. In the atomic norm case, the Hankel norm approximation was told to look for an order 3 system.

For beamforming, we chose L=180 to get an angle resolution of 1° (in the ideal case of no noise). For the atomic norm, we chose different values of M (the number of beams). For each value of M, we adjusted the beam power so that we always had 10 dB less total transmit power for the atomic norm method, i.e., we always had $E_{total,BF} = 10 \times E_{total,AN}$.

Thus, in the atomic norm method, whenever we had fewer beams, the energy per beam was higher (because the total energy $E_{total,AN}$ was always fixed to one tenth of $E_{total,BF}$). Looking at the performance from 4 beams to 24, and at different SNR values, does not show a significant performance difference. In all cases, the atomic norm method outperformed the beamforming method.

Thus, we were able to get performance as good, and often better, than the standard beamforming method with 10 dB less transmit energy, and with as few as 4 beams.

In all of the simulations we have used $\lambda=1$.

Application: Automobiles

Figure 18:
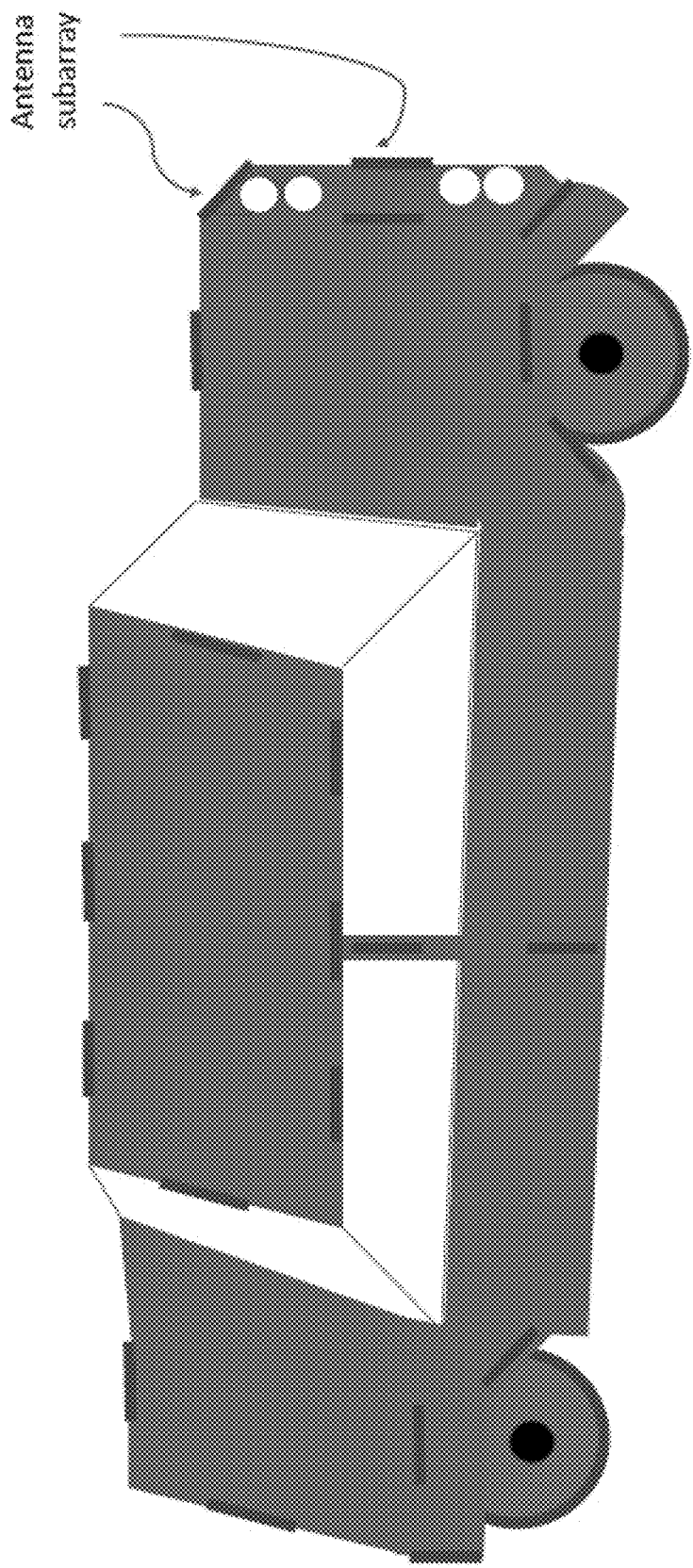
FIG. 18 illustrates an automobile equipped with a distributed set of subarray antennas in accordance with some embodiments.
Figure 19:
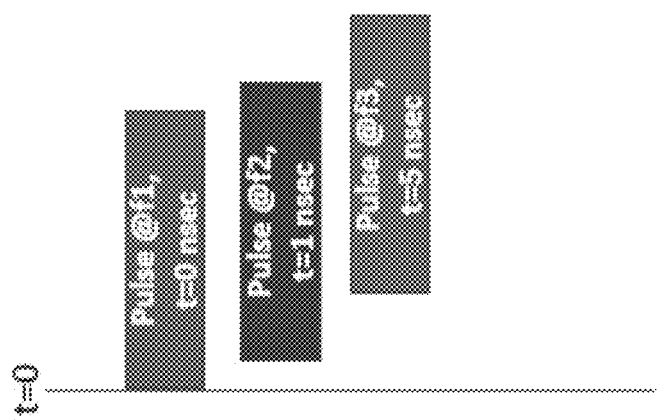
FIG. 19 illustrates three pulses transmitted at different frequencies in accordance with some embodiments.

In the exemplary embodiment shown in FIG. 18, a car is equipped with a distributed set of subarray antennas. In this particular example embodiment, the transmitters 110 and receive sensors 122 comprise multi-frequency antennas, which are assumed to be shared. There may be any suitable number of subarrays, and any suitable number of antennas per subarray. For example, there may be a total 32 subarrays, and each subarray has 4 antenna elements. In this example, we assume that each of the subarrays is a multiband subarray. The frequency bands can be any suitable frequency bands, e.g., the S, C, and/or X bands. In each band, one or more transmitters 110 can transmit a waveform 140 (e.g., a pulse) either simultaneously or with some offset as shown in FIG. 19.

The case for atomic norm application is as follows. The transmit pulse vector in each frequency band is uncorrelated and independent from the transmit pulse vector in every other frequency band. Because the channel is also independent in each frequency band, the received signal at each antenna from each band is an independent observation. For example, if the transmitters 110 transmit simultaneously three pulses at S, C, and X bands, as illustrated in FIG. 19, the receivers 120 observe 3 independent views.

In some embodiments, the objective at the receiver array 121 is to simulate the effect of a bigger aperture, and hence achieve a finer resolution. An advantage of the atomic norm techniques disclosed herein is that they do not require a narrow beam to obtain a fine angular resolution of the targets 130. As long as the receivers 120 have enough samples, the at least one processor 128 can use various techniques (related to non-uniform sampling theory, as are known in the art) that can make a sparse array "look" like a denser array by appropriately filling in missing spatial samples (e.g., using additional temporal measurements).

In summary, the approaches disclosed herein can be used to achieve advantages of a dense array of large aperture using only a sparse array. Because the receiver(s) 120 use optimization procedures (e.g., atomic norm-based procedures), the transmitter(s) 110 do not need a narrow beam to obtain fine angular resolution. Furthermore, the receivers 120 can make additional temporal measurements (e.g., sample more quickly, increase the listening time, transmit more beams, etc.) to fill in the missing spatial ones and make the array appear as if it is dense.

Building a Virtual Array From a Limited Set of Antennas

Figure 20:
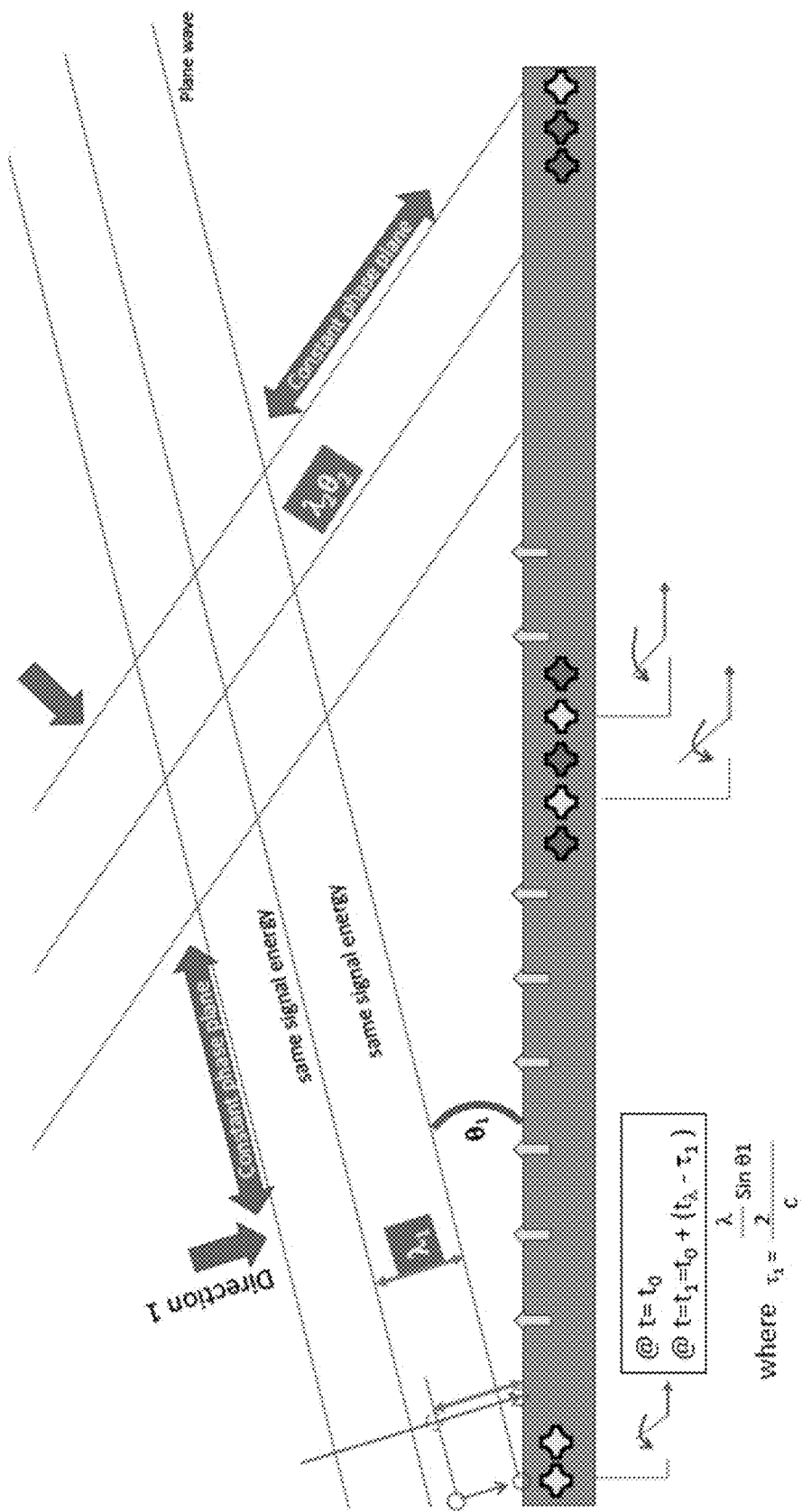
FIG. 20 illustrates propagation of example plane waves in accordance with some embodiments.

As shown in FIG. 20, example plane waves propagate in direction 1 and direction 2 and their angles of incidence of θ1 and θ2 are measured relative to a virtual straight line where the real and virtual antennas are supposed to be positioned.

The general idea is for the receiver(s) 120 to collect more samples than they might otherwise do from each of the sensors 122 and then use those extra samples to perform some geometrical transformation and interpolation such that the receiver(s) 120 recover the signals that were bound for virtual sensors located on virtual array with typical spacing of $\lambda/2$.

In some embodiments, some of the real receive sensors 122 are placed in close proximity to each other to enable collection of a rough estimate of the direction of wave propagation (or AoA). In some such embodiments, the receiver(s) 120 sample those receive sensors 122 at the same time and then estimate, for example, θ1 and/or θ2.

In FIG. 20, the plotted wavefront moves in direction 1 or 2 with parallel lines that are $\lambda$ apart (showing them via parallel straight lines; for now we are not treating a spherical wave propagation if the sources were nearby). The significance of showing waves $\lambda$ apart is that it is reasonable to assume the magnitude and phase of the signals stay the same when they are sampled at exactly $\lambda$ apart (or 360 degrees). Assume in wavefront 1, the signal hits the farthest corner of the linear array shown on the left-hand side of the figure (the edge of antenna array) at time $t_0$ and we would like to collect the next sample at time $t_1$ with the idea that the signal (amplitude and phase) should be equal to a signal at virtual antenna 1 at an earlier time $t_0$.

If the carrier frequency is 1 GHz, the time for a complete wave cycle is $t_\lambda=1$ nanosecond (ns). If the angle of incidence is 30 degrees, then $\tau_1$, which is given by $$\tau_1 = \frac{\frac{\lambda}{2}\sin(\theta 1)}{c},$$

is equal to 0.25 ns if the medium is air. The receivers 120 can sample the signals that hit antenna 0 at a time that provides the amplitude and phase we are looking for. In this example, the receiver 120 should sample at 0.75 ns after time $t_0$.

In some embodiments, when the receiver(s) 120 do not have an initial accurate estimate of the target 130 angles of arrival, the receiver(s) 120 can collect additional samples from each of the real sensors 122 and then solve an optimization problem to search for values θ that maximize the coherent gain of the array for a given angle of arrival.

In some applications, it might be difficult to collect samples with high time resolution. For example, if the carrier frequency is 10 GHz, then the resolution of the at least one ADC 126 to capture the time delta related to a 30 degree angle would be 0.025 ns, which corresponds to an ADC sample rate of 40 gigasamples per second, which may be challenging and/or expensive. In some embodiments, in order to avoid such high-resolution ADCs, the system 100 can be used to collect representative samples in space by placing some of the antennas close together. The placement could be subject to variety of parameters that will be appreciated by those having ordinary skill in the art. For example, in a dense implementation, the spacing between adjacent antennas might be $0.11\lambda$.

Figure 21:
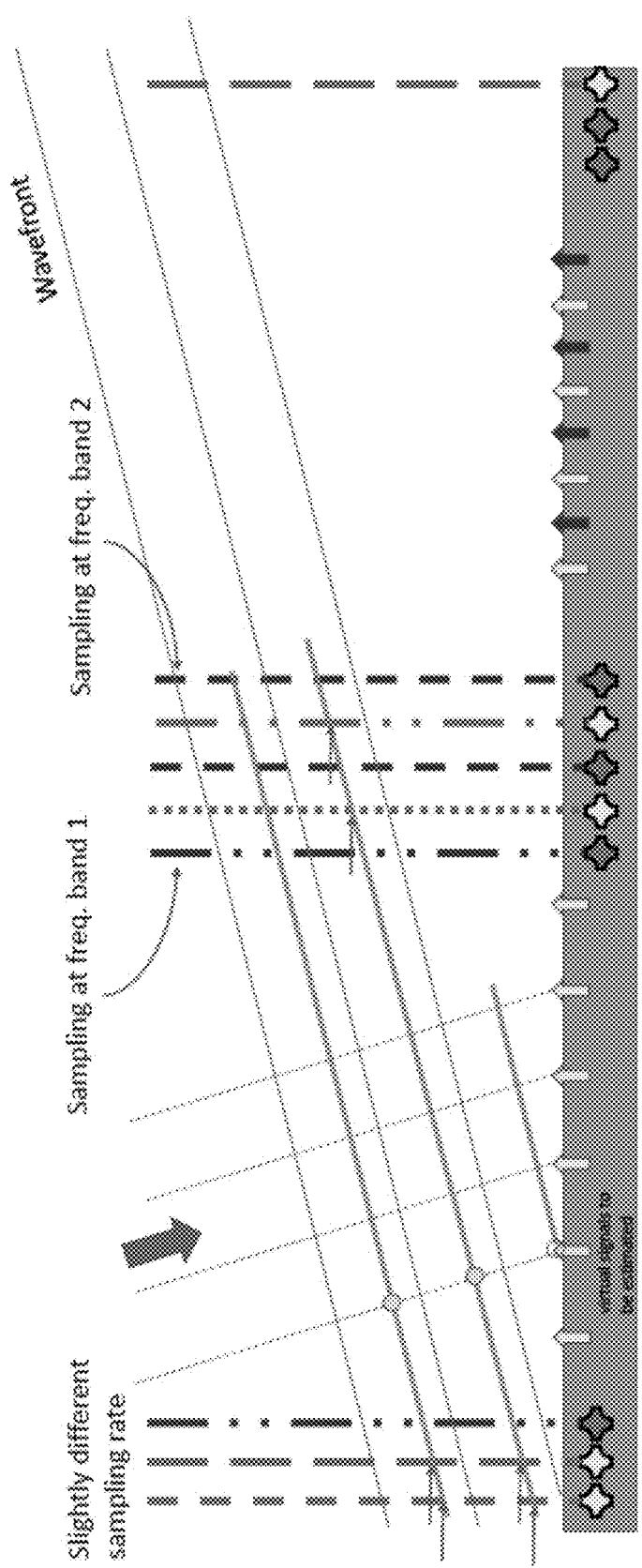
FIG. 21 illustrates how, in accordance with some embodiments, the receiver finds the intersection of sampling instances from real antennas and intersections with wavefronts.

If a sufficient number of antennas are positioned with enough distribution of distances between them, then the signal for virtual antenna 1 (or any number of virtual antennas) can be constructed by acquiring new time samples directly from linear antennas or some linear combination of a new time sample in addition to a linear combination of data from other antennas at time $t_0$. For example, if it is desirable to obtain a value of 7 sampled at 0.75 ns, but due to ADC resolution it is only possible to sample at 0.8 ns or 0.6 ns, the receiver(s) 120 can use 0.8 ns data and interpolate the data from 0.8 nsec and 0.6 nsec to drive the 0.75 ns sample value. In some embodiments, the table of data grows with each AoA considered, and it can become very large if all possible AoA are considered. Thus, in some embodiments, the receiver 120 (e.g., the at least one processor 128) finds the intersection of sampling instances from real antennas and intersections with wavefronts, as shown in FIG. 21. Those sampling instances are reflected in a spatial domain on the linear array and in some cases would fill exactly on a virtual array itself.

In conventional radar systems, normally the targets 130 are sparse and moving quickly. In applications such as autonomous navigation (or other applications in which an automobile is equipped with radar, LIDAR, etc.), the scene is fairly busy in some cases (e.g., in heavy traffic), and distances are very short. In such circumstances there are many signal reflections and multiple signal paths between the targets 130 and the receiver(s) 120, and the angles of arrival of the targets 130 can change almost continually. In such applications, the receiver 120 can search the entire three-dimensional scene and expect echo signals 142 to arrive from many directions.

In some embodiments, machine learning is included in the receiver(s) 120 to enable the receiver(s) 120 to find multiple angles of arrival simultaneously. Any suitable machine-learning approach may be used, such as, for example, clustering or K-means. Because the speed of understanding is on the order of one second (which is relatively slow when compared to other potential targets 130, such as a fast-moving missile or jet), the receiver 120 can search the entire three-dimensional scene with fine angular resolution using a perceived large array 121 that operates as disclosed above.

As explained previously, although this disclosure is presented in the context of wireless radars, the disclosures herein can be extended to other array processing in general, such as, for example, sonar arrays (e.g., in submarines), LIDAR, ultrasound medical imaging, etc.

In the foregoing description and in the accompanying drawings, specific terminology has been set forth to provide a thorough understanding of the disclosed embodiments. In some instances, the terminology or drawings may imply specific details that are not required to practice the claims.

To avoid obscuring the present disclosure unnecessarily, well-known components are shown in block diagram form and/or are not discussed in detail or, in some cases, at all. For example, and as explained above, RF techniques (upconversion from baseband to RF, and downconversion, whether to baseband or to an intermediate frequency) are well-known in the art. These conventional techniques are suitable for use with the disclosures herein. Likewise, and as also explained above, techniques to convert a signal from the analog domain (continuous-time, continuous-amplitude) to the digital domain (discrete-time, discrete-amplitude), referred to herein generally as "analog-to-digital conversion," are well known in the art. Conventional techniques are suitable for use with the disclosures herein.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used in the specification and the appended claims, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

As used in the specification and the appended claims, phrases of the form "at least one of A, B, and C," "at least one of A, B, or C," "one or more of A, B, or C," and "one or more of A, B, and C" are interchangeable, and each encompasses all of the following meanings: "A only," "B only," "C only," "A and B but not C," "A and C but not B," "B and C but not A," and "all of A, B, and C."

To the extent that the terms "include(s)," "having," "has," "with," and variants thereof are used in the detailed description or the claims, such terms are intended to be inclusive in a manner similar to the term "comprising," i.e., meaning "including but not limited to." The terms "exemplary" and "embodiment" are used to express examples, not preferences or requirements.

The term "between" is used herein refer to a relative position of one component with respect to other components. For example, a component disposed "between" two other components may be directly connected to those two components or may have one or more intervening components.

The drawings are not necessarily to scale, and the dimensions, shapes, and sizes of the features may differ substantially from how they are depicted in the drawings.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Specifically, the procedures described for range estimation can be used alone or in conjunction with the procedures described for AoA estimation and/or the procedures described for Doppler shift estimation. Similarly, the procedures described for AoA estimation can be used alone or in conjunction with the procedures described for range estimation and/or the procedures described for Doppler shift estimation. Likewise, the procedures described for Doppler shift estimation may be used alone or in conjunction with the procedures described for range estimation and/or the procedures described for AoA estimation. Accordingly, the specification and drawings are to be regarded in an illustrative rather than a restrictive sense.

We claim:

1. A system, comprising:
   a first sensor for receiving a first echo signal off of at least one target;
   a second sensor for receiving a second echo signal off of the at least one target;
   at least one analog-to-digital converter (ADC) coupled to the first and second sensors and configured to generate first samples of the first echo signal and second samples of the second echo signal; and
   at least one processor configured to execute at least one machine-executable instruction that, when executed, causes the at least one processor to:

using at least a portion of the first samples of the first echo signal and at least a portion of the second samples of the second echo signal, determine at least one range value, the at least one range value being an estimate of a distance between the first and second sensors and the at least one target, and for each range value of the at least one range value:
construct a respective array signal from the first and second samples,
obtain a respective denoised array signal from the respective array signal, and
apply an angle-of-arrival estimation algorithm to the respective denoised array signal to estimate a respective angle of arrival for each target of the at least one target.

2. The system recited in claim 1, wherein obtain the respective denoised array signal from the respective array signal comprises:
minimize an atomic norm of the respective denoised array signal subject to a constraint on a metric characterizing a closeness of the respective denoised array signal to the respective array signal.

3. The system recited in claim 2, wherein the atomic norm corresponds to a collection of atoms, wherein each atom is a planar wave with a respective arrival angle that differs from the respective arrival angle of every other atom.

4. The system recited in claim 2, wherein the metric characterizing the closeness of the respective denoised array signal to the respective array signal is a squared Euclidean distance.

5. The system recited in claim 2, wherein the metric characterizing the closeness of the respective denoised array signal to the respective array signal is an information-theoretic metric.

6. The system recited in claim 1, wherein obtain the respective denoised array signal from the respective array signal comprises:
minimize a metric characterizing a closeness of the respective denoised array signal to the respective array signal subject to a constraint on an atomic norm of the respective denoised array signal.

7. The system recited in claim 6, wherein the atomic norm corresponds to a collection of atoms, wherein each atom is a planar wave with a respective arrival angle that differs from the respective arrival angle of every other atom.

8. The system recited in claim 6, wherein the metric characterizing the closeness of the respective denoised array signal to the respective array signal is a squared Euclidean distance.

9. The system recited in claim 6, wherein the metric characterizing the closeness of the respective denoised array signal to the respective array signal is an information-theoretic metric.

10. The system recited in claim 1, wherein obtain the respective denoised array signal from the respective array signal comprises:
minimize a weighted sum of (a) a metric characterizing a closeness of the respective denoised array signal to the respective array signal and (b) an atomic norm of the respective denoised array signal.

11. The system recited in claim 10, wherein the atomic norm corresponds to a collection of atoms, wherein each atom is a planar wave with a respective arrival angle that differs from the respective arrival angle of every other atom.

12. The system recited in claim 10, wherein the metric characterizing the closeness of the respective denoised array signal to the respective array signal is a squared Euclidean distance.

13. The system recited in claim 10, wherein the metric characterizing the closeness of the respective denoised array signal to the respective array signal is an information-theoretic metric.

14. The system recited in claim 1, wherein the angle-of-arrival estimation algorithm comprises a Hankel norm approximation, MUSIC, ESPRIT, or Prony's method.

15. The system recited in claim 1, wherein the angle-of-arrival estimation algorithm comprises a projected gradient descent procedure.

16. The system recited in claim 1, wherein each of the first and second sensors comprises an antenna.

17. The system recited in claim 1, wherein the system is a radar system, a light detection and ranging (LIDAR) system, or a sonar system.

* * * * *

UNITED STATES PATENT AND TRADEMARK OFFICE
CERTIFICATE OF CORRECTION

PATENT NO. : 11,592,521 B1
APPLICATION NO. : 17/120127
DATED : February 28, 2023
INVENTOR(S) : Babak Hassibi and Behrooz Rezvani It is certified that error appears in the above-identified patent and that said Letters Patent is hereby corrected as shown below:

In the Specification

Column 27, Lines 7-10, the equation should appear as follows:
$$\|z\|_{\mathcal{A}} = \begin{cases} \max & \operatorname{Re}\lambda^* z \\ \text{subject to} & \begin{bmatrix} 1 & \lambda^* \\ \lambda & e_1 e_1^T + M \end{bmatrix} \geq 0 \text{ and the sums of the diagonals of } M \text{ are zero} \end{cases}$$

Column 27, Line 13, delete "and the sums of the diagonals of M are zero"

Column 28, Line 36, the equation should appear as follows:
min $dist(y, Dz) + \lambda \|z\|_{\mathcal{A}}$ Column 37, Lines 9-14, the equation should appear as follows:
$$\|x\|_{\mathcal{A}} = \begin{cases} \max & \operatorname{Re}\lambda^* x \\ \text{subject to} & \begin{bmatrix} 1 & \lambda^* \\ \lambda & e_1 e_1^T + M \end{bmatrix} \geq 0 \text{ and the sums of the diagonals of } M \text{ are zero} \end{cases}$$

Column 37, Line 15, delete "and the sums of the diagonals of M are zero"

Signed and Sealed this
Twenty-fourth Day of September, 2024

Katherine Kelly Vidal
*Director of the United States Patent and Trademark Office*